United States Patent
Inoue et al.

(10) Patent No.: US 8,269,487 B2
(45) Date of Patent: Sep. 18, 2012

(54) SHEET COIL TYPE RESOLVER

(75) Inventors: Tomoaki Inoue, Nagoya (JP); Takehide Nakamura, Handa (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 422 days.

(21) Appl. No.: 12/591,047

(22) Filed: Nov. 5, 2009

(65) Prior Publication Data

US 2010/0117631 A1 May 13, 2010

(30) Foreign Application Priority Data

Nov. 11, 2008 (JP) ................................. 2008-288914
Nov. 19, 2008 (JP) ................................. 2008-295391

(51) Int. Cl.
*G01B 7/14* (2006.01)
(52) U.S. Cl. ............................... 324/207.24; 324/207.25
(58) Field of Classification Search .................. None
See application file for complete search history.

(56) References Cited

U.S. PATENT DOCUMENTS

| | | | |
|---|---|---|---|
| 4,223,300 A | 9/1980 | Wiklund | |
| 6,566,862 B1 * | 5/2003 | Goto et al. | 324/207.16 |
| 2003/0102862 A1 * | 6/2003 | Goto et al. | 324/207.16 |
| 2006/0043815 A1 * | 3/2006 | Miya et al. | 310/216 |
| 2006/0125588 A1 * | 6/2006 | Miya | 336/120 |
| 2008/0309527 A1 * | 12/2008 | Inoue | 341/116 |

FOREIGN PATENT DOCUMENTS

| | | |
|---|---|---|
| CH | 637 250 A5 | 7/1983 |
| DE | 699 30 643 T2 | 8/2006 |
| EP | 1 152 223 B1 | 3/2006 |
| GB | 840099 | 7/1960 |
| JP | A 05-312590 | 11/1993 |
| JP | A 07-211537 | 8/1995 |
| JP | A 08-292066 | 11/1996 |
| JP | A 2000-292205 | 10/2000 |

OTHER PUBLICATIONS

Office Action for corresponding German Patent Application No. 10 2009 052 764.8-52, dated Jan. 20, 2011 (w/ English translation).
Office Action issued in Chinese Patent Application No. 200910221651.2 dated Jul. 12, 2011 (with translation).

* cited by examiner

*Primary Examiner* — Minh N Tang
(74) *Attorney, Agent, or Firm* — Oliff & Berridge, PLC

(57) ABSTRACT

A resolver includes an excitation coil for receiving an excitation signal and a detection coil for outputting a detection signal. The detection sine wave is changeable according to an amount of displacement of a movable element provided in the excitation coil or the detection coil. The resolver detects the amount of displacement of the movable element based on the excitation signal and the detection signal. The detection coil is one coil formed of a first detection coil pattern and a second detection coil pattern connected in series or in parallel such that the second detection coil pattern is shifted in phase by a half cycle from the first detection coil pattern.

13 Claims, 21 Drawing Sheets

US 8,269,487 B2

SHEET COIL TYPE RESOLVER

CROSS-REFERENCE TO RELATED APPLICATIONS

This application is based upon and claims the benefit of priority from each of the prior Japanese Patent Applications No. 2008-288914 filed on Nov. 11, 2008 and No. 2008-295391 filed on Nov. 19, 2008, the entire contents of which are incorporated herein by reference.

TECHNICAL FIELD

The present invention relates to a resolver to be used for detecting rotation angle of an output shaft of a vehicle motor.

BACKGROUND ART

As for a hybrid electric vehicle and an electric vehicle, a high-power brushless motor is used. Furthermore, a higher power motor will be expected. To control the brushless motor of a hybrid electric vehicle, it is necessary to accurately ascertain the rotation angle of an output shaft of the motor. This is because the rotation position (angle) of a rotor needs to be correctly ascertained in order to control switching of energization of coils of a stator.

Accordingly, the motor preferably includes a resolver to accurately detect the angle. Such resolver used in a drive mechanism of a vehicle is required to provide high accuracy in addition to environment resistance because of the high number of revolution of the drive mechanism. As with other in-vehicle components, the resolver is also demanded to achieve size reduction and cost reduction.

For increasing the accuracy of the resolver, a method using "skew" is conceivable. Specifically, methods for preventing distortion of a sine wave output from a magnetic resolver include a method of changing magnetic pole pitches of a rotor core and a stator core and a skew method of placing a stator core in an oblique position with respect to a rotor core (see JP 5(1993)-312590A).

On the other hand, a printed circuit has been known to reduce the size of a resolver. A pattern pitch in an arranging direction of a sheet coil to be provided on a base plate is adjusted to an irregular pitch, thereby preventing a higher harmonic wave from overlapping an electromotive waveform to enhance detection accuracy (see JP 7(1995)-211537A).

Furthermore, there is a sheet coil type resolver in which an excitation phase coil includes a spiral coil provided on a front side of an insulation sheet layer and a spiral coil provided on a back side and wound in a reverse direction from the front-side coil when the back-side coil is viewed in the same direction as the front-side coil, and a detection coil includes a spiral coil provided on a front side of an insulation sheet layer and a spiral coil provided on a back side and with an electrical phase difference of 90° from the front-side coil, the excitation phase coil and the detection coil being placed to face each other through a gap and to be relatively movable. The spiral coil of the excitation phase coil is formed of joining of a circular conductor and a linear conductor or formed in a wound form connected to a circular or linear conductor. The front-side spiral coil and the back-side spiral coil of the detection layer coil are connected in sequence to a half sine wave conductor and a circular or linear conductor. This configuration is able to reduce displacement errors and provide a resolver with little angle error (see JP 8(1996)-292066A).

However, from the viewpoint of cost reduction of the resolver, the use of the spiral coils is undesirable because such configuration inevitably requires a winding process during manufacture. Cost reduction is therefore not easily realized.

The use of windings additionally requires a process of winding a wire on a bobbin and a process of mounting a coil and increases the number of resolver components. This is an impediment to the cost reduction. The coil also requires a certain level of thickness and hence thickness reduction is also difficult.

On the other hand, when a printed circuit is adopted, the use of a sheet coil can realize thickness reduction. However, the electromotive force waveform becomes a stepped sine waveform because of the use of the sheet coil. Thus, a cyclic error component is picked up on a detection side, causing a detection error.

This would cause a problem that accuracy improvement is difficult. To increase detection accuracy, it is conceivable to adopt the aforementioned "skew", but it is not directly applicable due to differences in shape.

In the case of adopting a configuration disclosed in JP 8(1996)-292066A, the detection accuracy can be increased but noise is not completely eliminated.

In detecting cyclic error components on the detection side, several peaks appear as seen in a graph showing relation between sensor error and error order (see FIG. 7 mentioned later). Even this method could only provide such an advantageous result that eliminates one of the peaks. Under present circumstances, there is a demand for detection accuracy improvement using other methods.

The present invention has a purpose to provide a thin-shaped resolver with increased accuracy.

SUMMARY OF INVENTION

Technical Problem

To achieve the above purpose, one aspect of the present invention provides a resolver for detecting an amount of displacement of a movable element, the resolver comprising: an excitation coil for receiving an excitation signal; and a detection coil for outputting a detection signal, wherein one of the detection coil and the excitation coil includes a first coil and a second coil that are placed to overlap with each other and connected in series or in parallel so that the second coil is shifted in phase from the first coil.

According to another aspect, the present invention provides a resolver for detecting an amount of displacement of a movable element, the resolver comprising: an excitation coil for receiving an excitation signal; a detection coil for outputting a detection signal; wherein one of the excitation coil and the detection coil includes a first coil part and a second coil part placed adjacent to the first coil part, and the first and second coil parts have the same coil area and the second coil part is shifted in phase from the first coil.

DESCRIPTION OF EMBODIMENTS

A first detailed description of a preferred embodiment of the present invention will now be given referring to the accompanying drawings.

First Embodiment

Figure 1A:
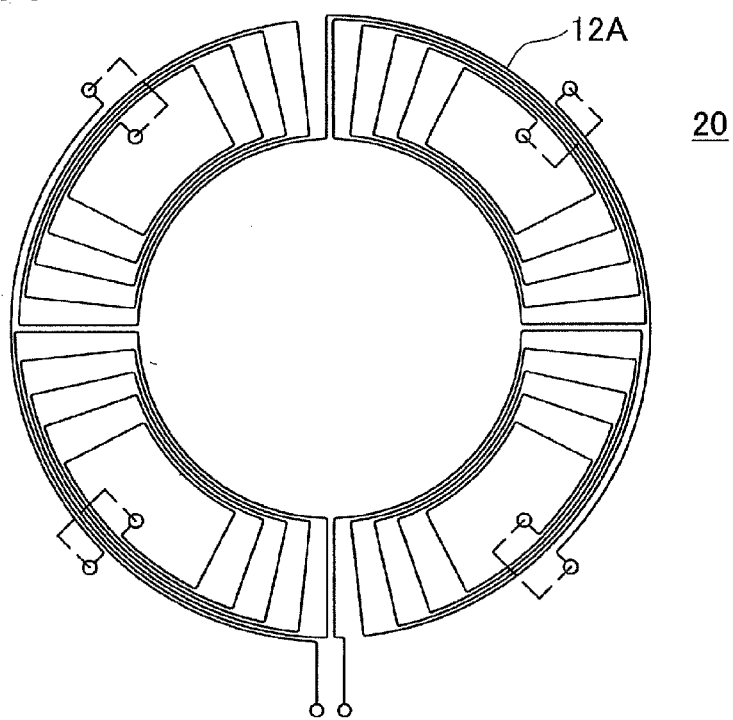
FIG. 1A is a coil pattern diagram of a first excitation coil of an excitation coil in a first embodiment.
Figure 1B:
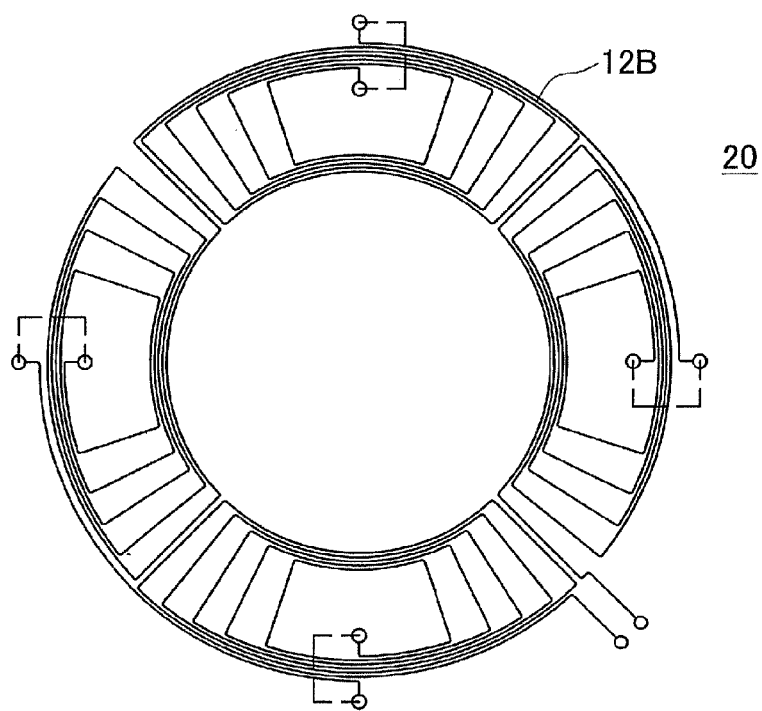
FIG. 1B is a coil pattern diagram of a second excitation of the excitation coil in the first embodiment.
Figure 2:
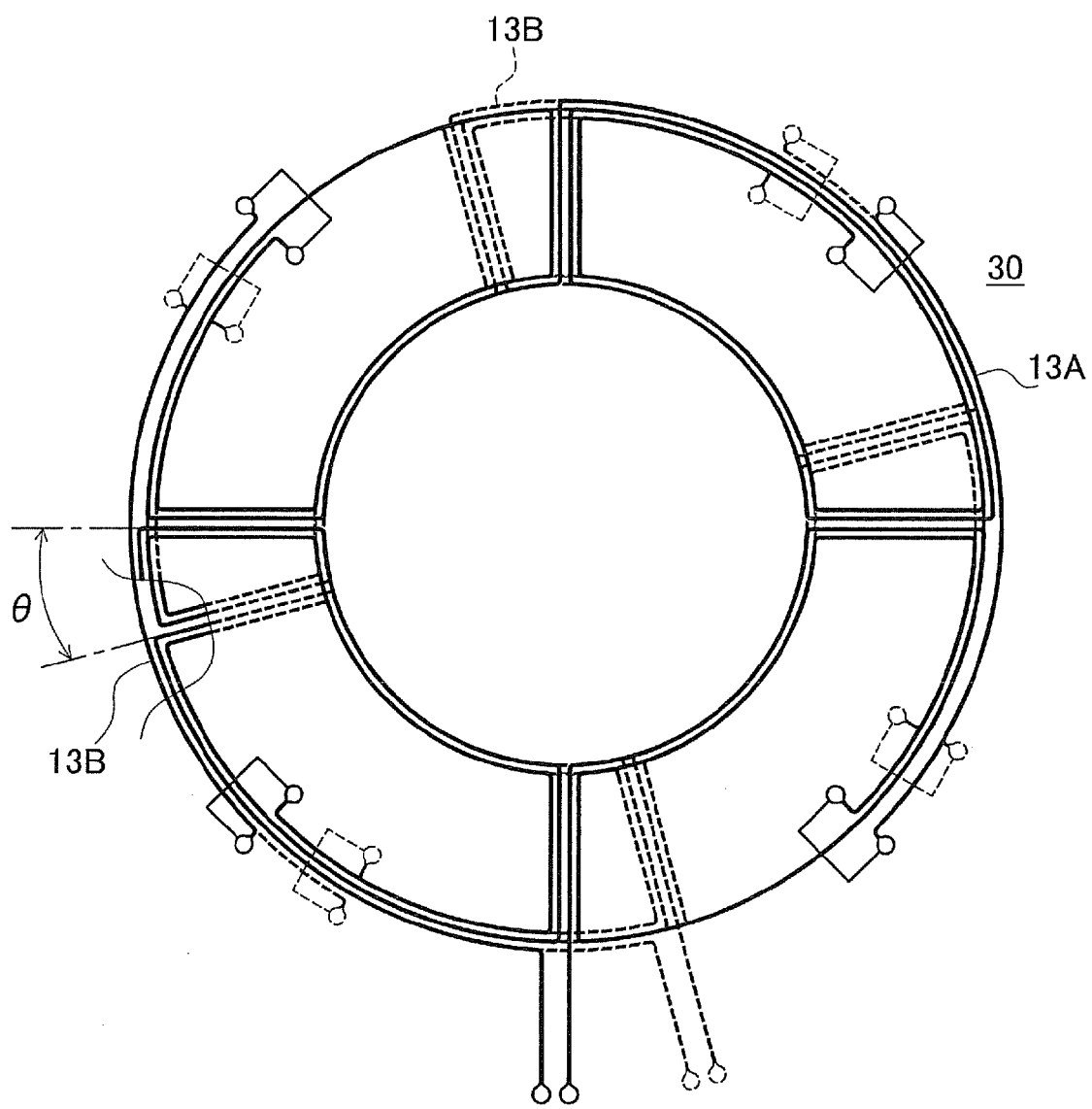
FIG. 2 is a coil pattern diagram of a detection coil in the first embodiment.
Figure 3:
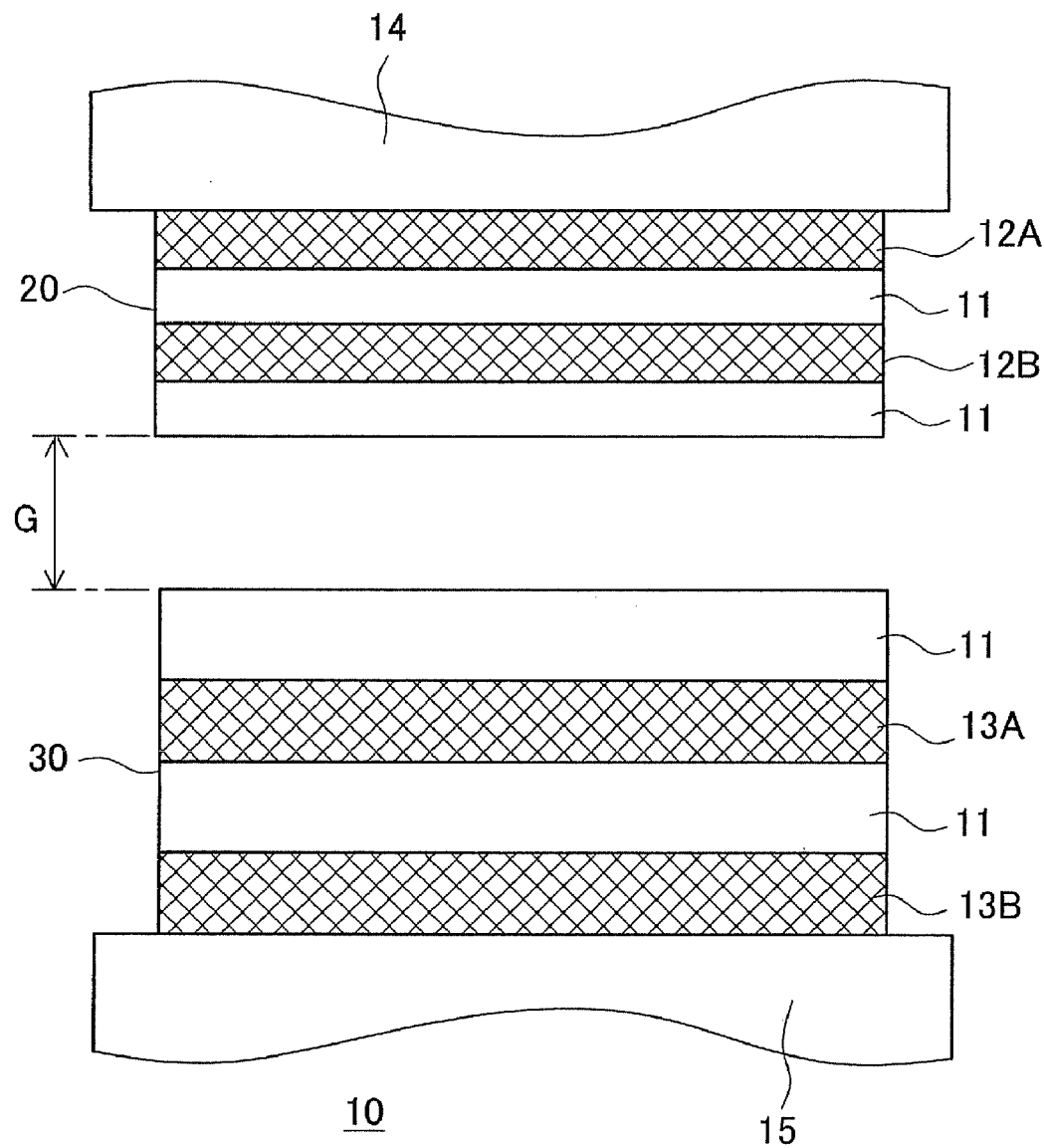
FIG. 3 is a schematic cross sectional view of a resolver in the first embodiment.

The configuration of a first embodiment is first explained. FIG. 1A is a coil pattern diagram of a first excitation coil of an excitation in the first embodiment. FIG. 1B is a coil pattern diagram of a second excitation coil of the excitation coil. FIG. 2 is a coil pattern diagram of a detection coil and FIG. 3 is a schematic cross sectional view of a resolver.

A resolver 10 includes an excitation coil 20 and a detection coil 30. As shown in FIG. 3, the excitation coil 20 and the detection coil 30 are placed with a gap G. Each of the coils 20 and 30 is formed of base plates 11 and printed patterns formed thereon. On the excitation coil 20 side, a first excitation coil pattern 12A serving as a first excitation coil 20A (see FIG. 4) to which a sine wave is to be supplied and a second excitation coil pattern 12B serving as a second excitation coil 20B (see FIG. 4) to which a cosine wave is to be supplied are placed to overlap with each other. On the detection coil 30 side, a first detection coil pattern 13A and a second detection coil pattern 13B are placed to overlap with each other. The excitation coil 20 is attached to a fixed element 14 and the detection coil 30 is an attached to a movable element 15.

The first excitation coil pattern 12A, the second excitation coil pattern 12B, the first detection coil pattern 13A, and the second detection coil pattern 13B, which are formed on the corresponding base plates 11, have such shapes as shown in FIGS. 1A, 1B, and 2 respectively.

The first excitation coil pattern 12A and the second excitation coil pattern 12B constitute the excitation coil 20 having four magnetic poles and axial double angle of two. Accordingly, two S poles and two N poles are alternately placed. The first excitation coil pattern 12A shown in FIG. 1A and the second excitation coil pattern 12B shown in FIG. 1B are placed to overlap with each other at positions shifted or displaced by 90° in electrical angle form the excitation coil 20. Even though not shown, a combination structure of the first excitation coil pattern 12A and the second excitation coil pattern 12B placed to overlap with each other is hereinafter referred to as an excitation coil pattern 12.

On the other hand, in the detection coil pattern 13, each of the first coil pattern 13A and the second coil pattern 13B is provided with four poles in correspondence with the excitation coil pattern 12. The first coil pattern 13A illustrated by a solid line in FIG. 2 is disposed at such a position that the angle occupied by the pattern for one pole is 180° in electrical angle. In other words, the coil width is 180° in electrical angle.

The second coil pattern 13B is disposed at a place shifted by a shift angle θ in electrical angle from the first coil pattern 13A. This second coil pattern 13B is bonded on the back surface of the base plate 11 opposite the first coil pattern 13A.

Herein, the shift angle θ is represented by the expression: θ=360/(N×2), where N represents the error order. For example, if the error order is 4, the cycle of error is 90° (2θ=90°) and the shift angle θ is 45° in electrical angle. Specifically, the shift angle θ corresponds to one half period of the error cycle. The error order will be mentioned later.

The first detection coil pattern 13A and the second detection coil pattern 13B are coupled in series or in parallel. Hereinafter, the combination structure of those coil patterns 13A and 13B placed to overlap with each other is referred to as a detection coil pattern 13.

Figure 4:
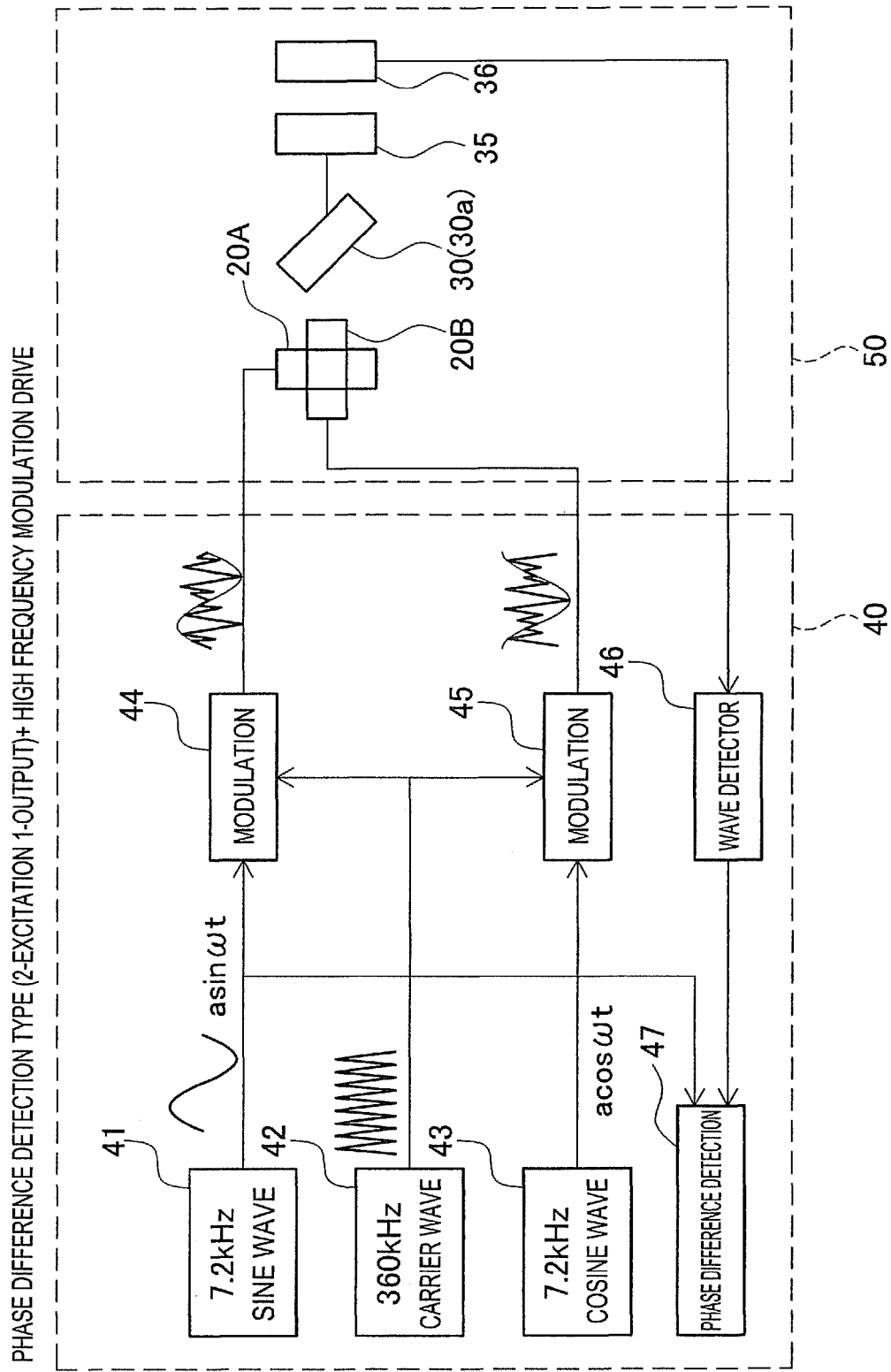
FIG. 4 is a block diagram showing position detecting control of the resolver in the first embodiment.

FIG. 4 is a block diagram showing position detection control of the resolver. The resolver 10 includes a circuit section 40 and a sensor section 50. The circuit section 40 includes a sine wave generator 41, a high frequency generator 42, a cosine wave generator 43, a first modulator 44, a second modulator 45, a wave detector 46, and a phase difference detector 47. The sensor section 50 includes the excitation coil 20, the detection coil 30, a first rotary transformer 35, and a second rotary transformer 36.

The sine wave generator 41 for generating a sine wave of 7.2 kHz is connected to the first modulator 44 as shown in FIG. 4. The cosine wave generator 43 for generating a cosine wave of 7.2 kHz is connected to the second modulator 45.

The high frequency generator 42 for generating a sine wave of 360 kHz is connected to the first modulator 44 and the second modulator 45 respectively. The sine wave generator 41 is connected to the phase difference detector 47. The wave detector 46 is connected to the phase difference detector 47. The first modulator 44 is connected to the first excitation coil 20A. The second modulator 45 is connected to the second excitation coil 20B.

The detection coil 30 is connected to the first rotary transformer 35. The second rotary transformer 36 is connected to the wave detector 46.

The resolver 10 in the first embodiment has the above configuration and therefore provides the following operations.

Figure 5:
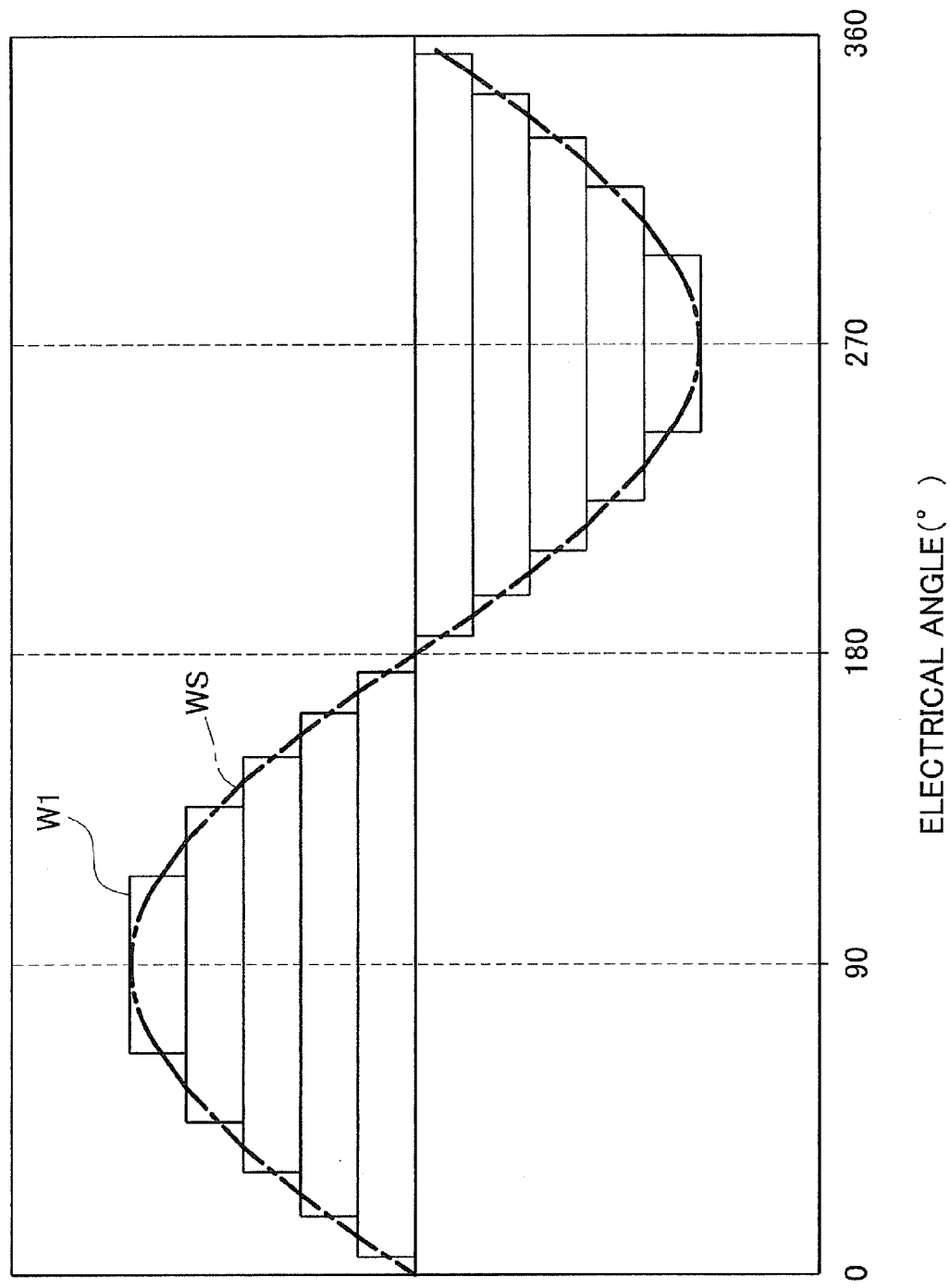
FIG. 5 is a graph showing an electromotive force waveform generated in the excitation coil in the first embodiment.

FIG. 5 is a graph showing a magnetomotive force waveform generated in the excitation coil 20. In the graph, a vertical axis indicates magnetic force and a lateral axis indicates electrical angle. A magnetomotive force waveform W1 generated by the excitation coil 20 is plotted to overlap with an ideal waveform WS.

A high frequency carrier wave generated in the high frequency generator 42 is subjected to for example AM balanced modulation (hereinafter, referred to as AM modulation) by the sine wave generated in the sine wave generator 41 in the first modulator 44 and then is transmitted to the first excitation coil 20A.

Simultaneously, the high frequency carrier wave is subjected to AM modulation by the cosine wave generated in the cosine wave generator 43 in the second modulator 45 and then is transmitted to the second excitation coil 20B.

The high frequency signal AM-modulated by the cosine wave is supplied to the second excitation coil 20B while the high frequency signal AM-modulated by the sine wave is supplied to the first excitation coil 20A. Since the AM-modulated high frequency signals are used as excitation signals, coupling of the excitation coil pattern 12 and the detection coil pattern 13 becomes stronger than the case when low frequency signals are used. Therefore, higher voltage can be generated in the detection coil 30. However, the magnetomotive force waveform W1 is a stepped sine wave as shown in FIG. 5 and thus a signal detected by a conventional detection coil is in such a state as shown in FIG. 6.

Figure 6:
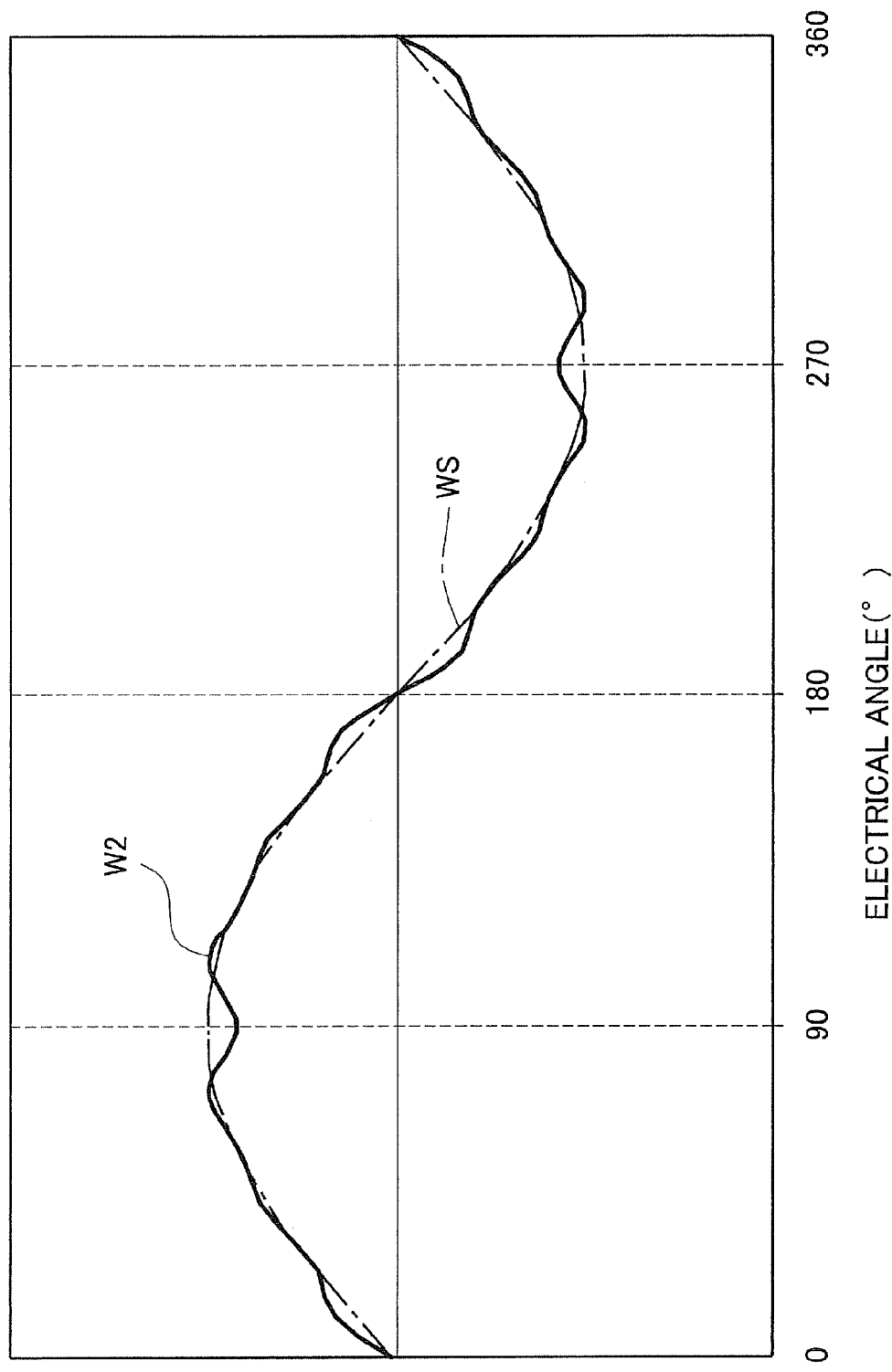
FIG. 6 is a graph showing a waveform detected by the detection coil.

FIG. 6 is a graph showing a waveform detected by a detection coil including only a first coil. In the graph, a vertical axis indicates magnetic force and a lateral axis indicates electrical angle. A detection waveform W2 detected by the detection coil is plotted to overlap with the ideal waveform WS. In this way, the detection coil that does not include a second coil shifted in phase detects a waveform like the detection waveform W2.

Figure 7:
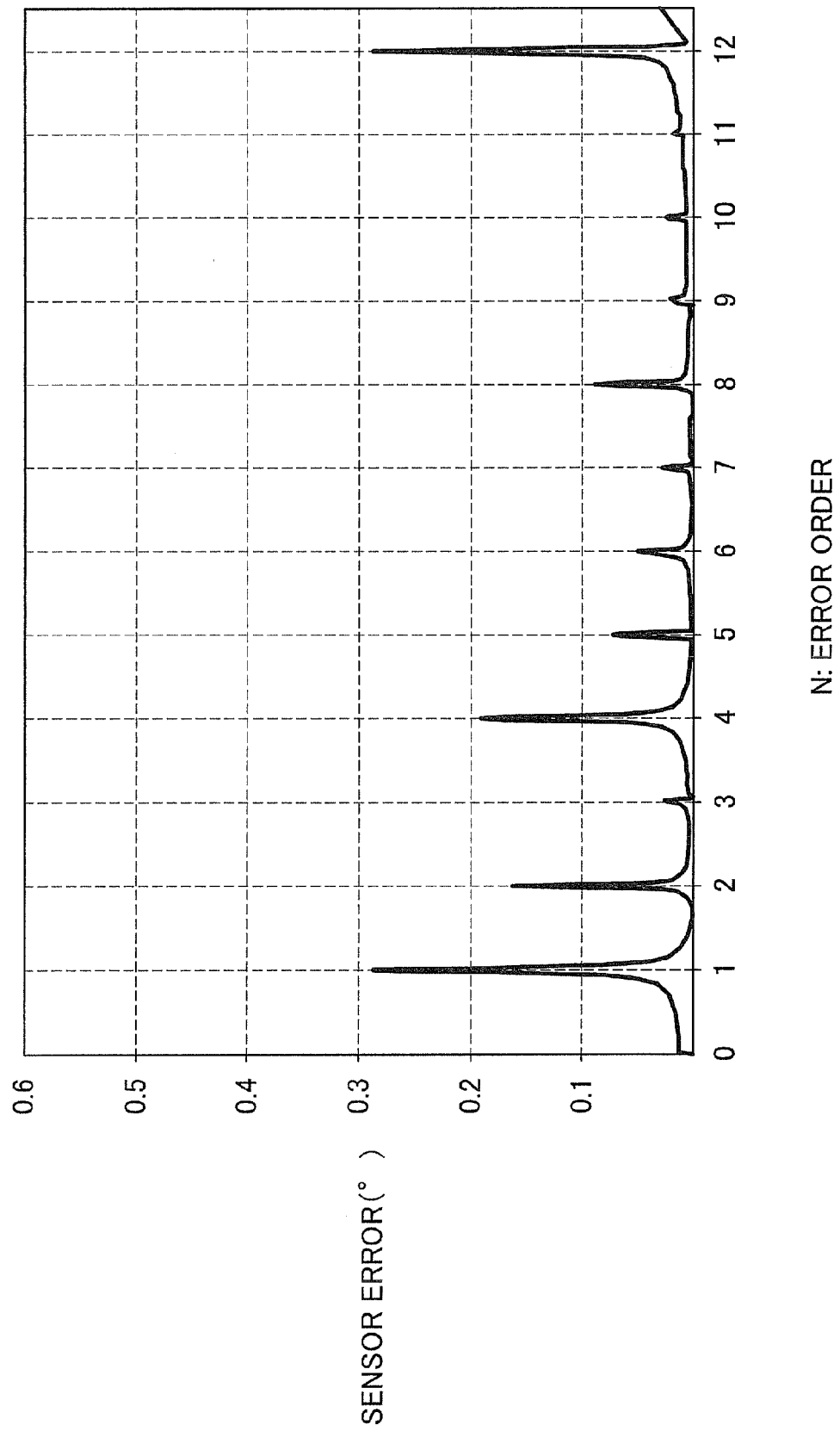
FIG. 7 is a graph showing relation between sensor error and error order (order of errors)

FIG. 7 is a graph showing relation between sensor error and error order. The graph in FIG. 7 also shows detection results in the detection coil including only the first coil and not including a second coil. In the graph, a vertical axis indicates sensor error and the lateral axis indicates error order.

When detects the magnetomotive force waveform W1 output from the excitation coil 20, the detection coil detects a waveform like the detection waveform W2. The detection waveform W2 follows the ideal waveform WS but causes sensor errors as shown in FIG. 7. Each protruding portion represents noise which is a detection error in the detection coil.

Such error is unavoidable when the magnetomotive force waveform W1 shown in FIG. 5 is generated by use of the excitation coil pattern 12 shown in FIGS. 1A and 1B. However, when the first and second detection coil patterns 13A and 13B are placed to overlap with each other at positions shifted in phase by the shift angle θ in electrical angle to form the detection coil 30, the detection coil 30 can correct the errors.

This error correction method is achieved by using the detection coil 30 produced in such a manner that the first detection coil pattern 13A shown in FIG. 2 is formed on the base plate 11 and the second detection coil pattern 13B is formed on the other base plate 11, and the base plates 11 are laminated so that the coil patterns 13A and 13B are shifted from each other by the shift angle θ in electrical angle.

This shift angle θ is determined by the expression:

$$\theta = 360/(N \times 2)$$

where N is the error order corresponding to a peak desired to be eliminated from among the errors in FIG. 7. In this embodiment, the error order is 4. This shift angle θ is an electrical angle and corresponds to one half of the error cycle as shown in FIG. 8.

The magnetomotive force waveform W1 generated from the excitation coil 20 is detected by the detection coil 30. However, the first detection coil pattern 13A and the second detection coil pattern 13B are shifted by the shift angle θ in electrical angle as shown in FIG. 2 and therefore errors are canceled out by the waveform detected by the first detection coil pattern 13A and the waveform detected by the second detection coil pattern 13B.

Figure 8:
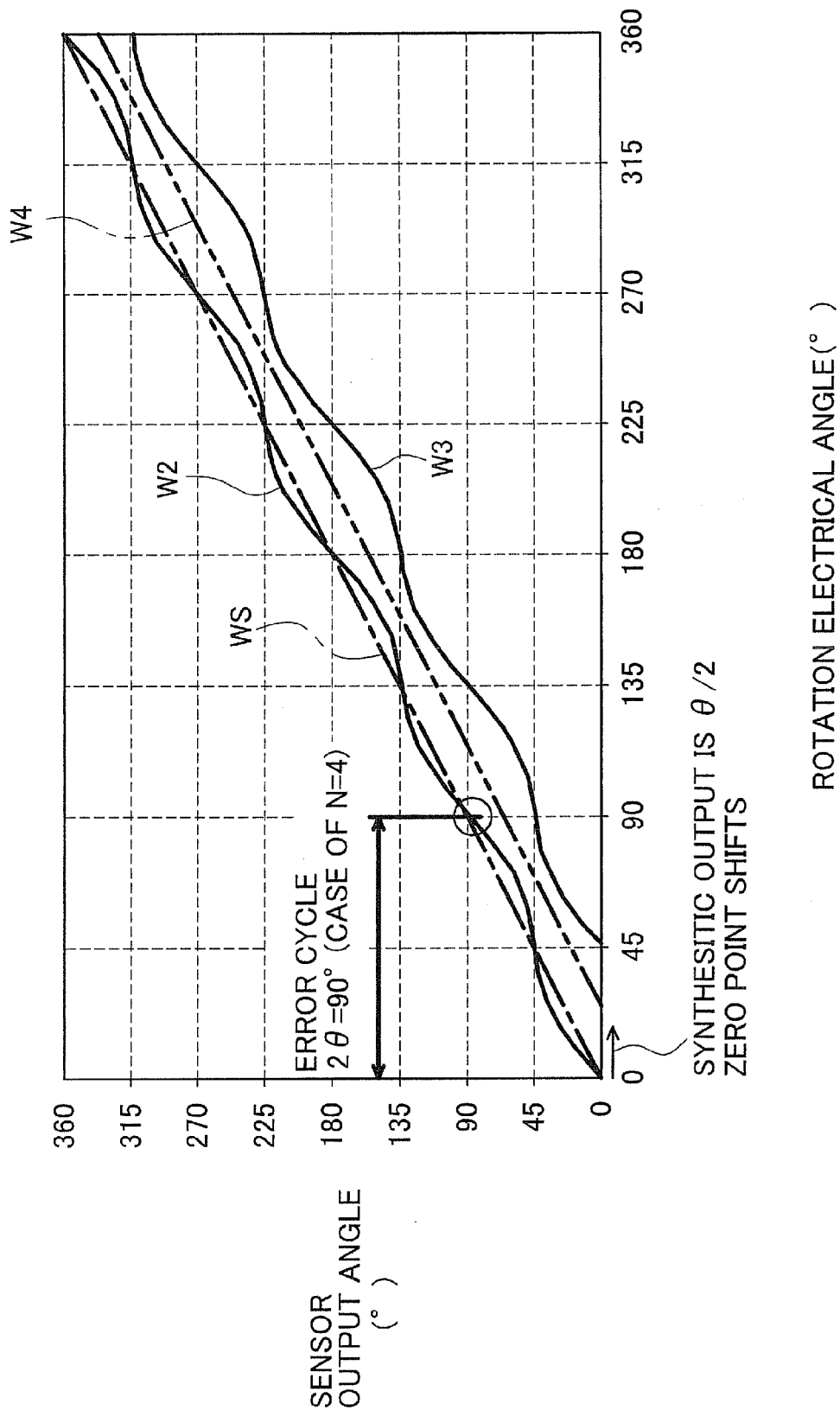
FIG. 8 is a graph showing composite coil output waveforms in the first embodiment.

FIG. 8 is a graph showing a synthetic waveform output from a coil.

A signal waveform generated in the first detection coil pattern 13A is the detection waveform W2. A signal waveform generated in the second detection coil pattern 13B is a detection waveform W3 having a phase lag of 45° from the detection waveform W2. This detection waveform W3 is a component having an opposite phase to an error component of a 90° cycle. The detection waveform W2 and the detection waveform W3 are configured to obtain a synthetic waveform W4.

Start points of the detection waveform W2 and the detection waveform W3 are points shifted by the shift angle θ in electrical angle. The resultant synthetic waveform W4 starts at a point delayed by θ/2 as compared with the start point of the detection waveform W2.

In the resolver 10 in the first embodiment, the detection waveform W2 and the detection waveform W3 are virtually obtained waveforms. An actually waveform obtained by the detection coil 30 is the synthetic waveform W4.

The resolver 10 in the first embodiment having the aforementioned configuration and operations can provide the following advantages.

A first advantage is to provide a resolver with high accuracy. The resolver 10 in the first embodiment includes the excitation coil 20 for receiving an excitation signal and the detection coil 30 for outputting a detection signal. The detection signal changes according to a displacement amount of the movable element 15 provided with the excitation coil 20 or the detection coil 30. The resolver 10 detects the displacement amount of the movable element 15 based on a phase difference between the excitation signal and the detection signal. In this resolver 10, the detection coil 30 includes the first detection coil pattern 13A and the second detection coil pattern 13B that are placed to overlap with each other and connected in series or in parallel while the second detection coil pattern 13B is shifted in phase from the first detection coil pattern 13A. The amount of phase shift between the coil patterns 13A and 13B corresponds to one half of the order cycle of the detection error desired to be canceled from among the detection errors occurring when the coil patterns 13A and 13B are placed with no phase shift.

When the second coil pattern 13B is placed at a position shifted by the angle θ in electrical angle from the first coil pattern 13A, an opposite phase signal achieves the cancel effect. Accordingly, the synthetic waveform W4 is produced by synthesis of the detection waveform W2 detected by the first coil pattern 13A and the detection waveform W3 detected by the second coil pattern 13B.

As above, one of the peaks of the waveform shown in FIG. 7 is canceled out, resulting in improved accuracy of the resolver 10. In this embodiment, N=4 and thus the fourth peak from left in FIG. 7 is canceled out. That is, the synthetic waveform W4 is produced as a signal having no fourth peak in FIG. 7.

Furthermore, another advantage is to achieve both thickness reduction and accuracy improvement of the resolver 10. In the resolver 10 in the first embodiment, at least one of the detection coil 30 and the excitation coil 20 is a flat-shaped coil.

By the configuration that the excitation coil pattern 12 and the detection coil pattern 13 are formed on the base plates 11, the thin-shaped resolver 10 can be realized. This may be configured by making either the excitation coil 20 or the detection coil 30 in the form of a sheet coil or both of them in the form of a sheet coil as in the first embodiment. If such a sheet coil form is adopted, however, the excitation coil 20 may cause a problem shown in FIG. 5 that when the magnetomotive force waveform W1 is detected by the conventional detection coil, a waveform like the detection waveform W2 is obtained.

Therefore, the detection coil 30 is configured such that the first detection coil pattern 13A and the second detection coil pattern 13B are placed at the positions shifted by the shift angle θ in electrical angle corresponding to one half of the error cycle of the error order desired to be canceled out. Accordingly, the cancel effect can be obtained by the opposite phase signal, thereby achieving both thickness reduction and accuracy improvement of the resolver 10.

Furthermore, the output of the resolver 10 can be increased. In the resolver 10 in the first embodiment, the coil width of each of the first detection coil pattern 13A and the second detection coil pattern 13B is set at 180° in electrical angle.

When a total coil width of the first coil pattern 13A and the second coil pattern 13B is equal to or larger than 180° in electrical angle, the output of the detection coil 30 can be increased.

In the case where the excitation coil 20 and the detection coil 30 of the resolver 10 are each made of a sheet coil, it is difficult to make a large amount of current flow through such sheet coil.

However, the first coil pattern 13A and the second coil pattern 13B have a total coil width of larger than 180° in electrical angle and therefore the magnetomotive force waveform W1 from the excitation coil 20 can be efficiently detected. Thus, the output from the detection coil 30 can be increased.

A second embodiment of the invention will be described below with reference to the accompanying drawings.

Second Embodiment

The second embodiment differs in the movable element 15 formed of a linearly movable element from the first embodiment in which the movable element 15 is a rotatable element. The following explanation is therefore focused on the differences from the first embodiment.

Figure 9:
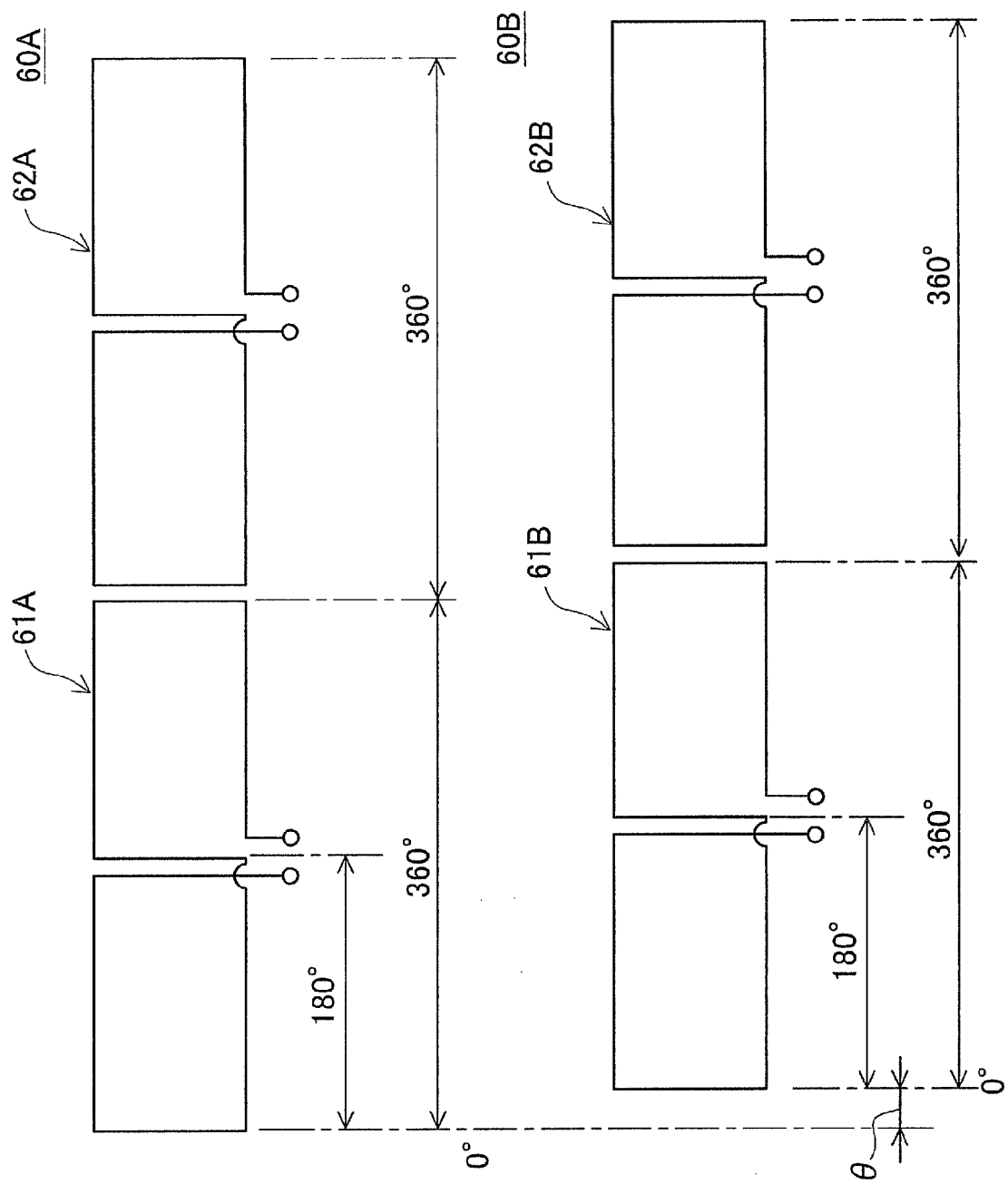
FIG. 9 is a coil pattern diagram of a detection coil in a second embodiment.
Figure 10:
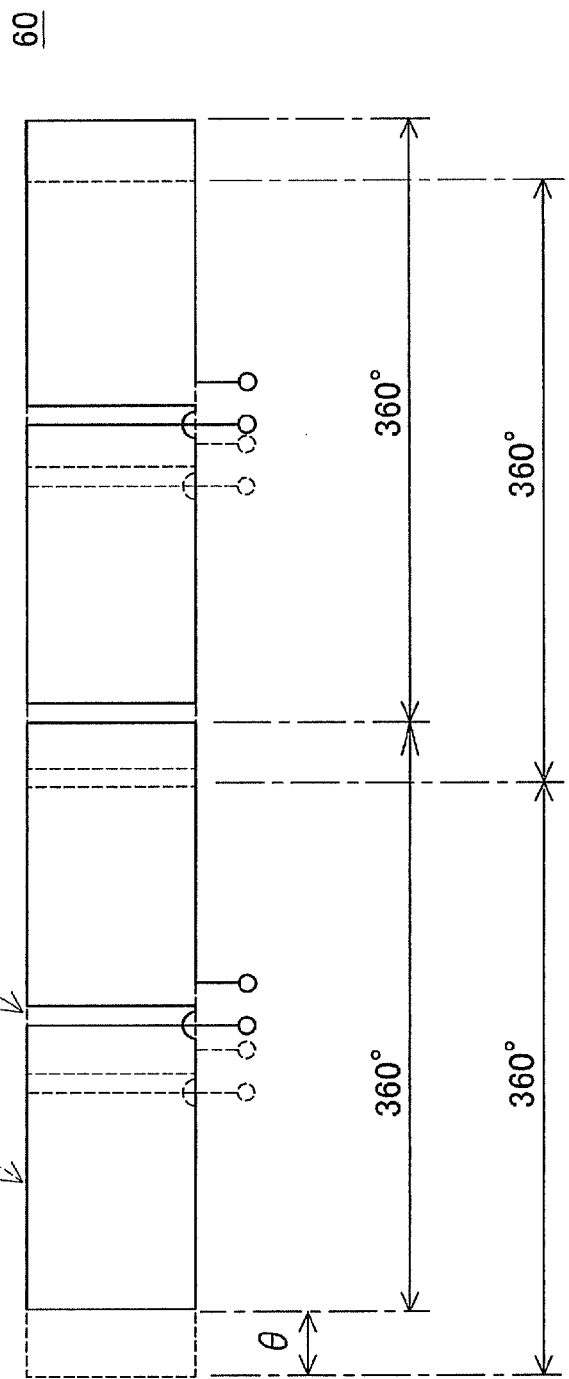
FIG. 10 is a coil pattern diagram of a detection coil formed of two laminated coils in the second embodiment.

FIG. 9 is a coil pattern diagram in the second embodiment. Each coil pattern is illustrated in a simplified form but has actually plural winding turns. FIG. 10 is a coil pattern diagram showing a state where two coils are placed to overlap with each other.

A detection coil 60 is constituted of two linear-movement detection coils 60A and 60B for detecting an amount of movement (displacement) of a linearly movable body as shown in FIG. 9. These coils 60A and 60B are placed in overlapping relation as shown in FIG. 10.

The linear-movement detection coil 60A includes two coil patterns 61A and 62A adjacently formed on a base plate in the same pattern so that the coil patterns 61A and 62A are arranged in series, each having a width corresponding to 360° in electrical angle.

On the other hand, the linear-movement detection coil 60B is a coil having an identical printed pattern to the linear-movement detection coil 60A but shifted by a half cycle, i.e., by the shift angle θ from the coil 60A. The coil 60B includes coil patterns 61B and 62B. Those linear-movement detection coils 60A and 60B are formed on base plates 11 not shown respectively. The coils 60A and 60B are placed in overlapping relation by lamination of the base plates 11 to form the detection coil 60.

An excitation coil not shown is also placed in linear form. As in the first embodiment, the number of magnetic poles is 4 and the axial double angle is 2. By use of the excitation coil and the detection coil 60, a 2× linear-movement type resolver can be produced.

The control of the linear-movement type resolver is substantially the same as in the first embodiment and therefore is not explained here.

The linear-movement type resolver in the second embodiment has the above configuration and can provide the following operations and advantages.

The linear-movement type resolver in the second embodiment includes the detection coil 60 configured such that the linear-movement detection coils 60A and 60B are placed in the positions shifted by one half of the error cycle, i.e., by the shift angle θ. This can achieve the cancel effect by the opposite phase signal as shown in FIG. 8. As a result, thin-shaped accurate linear-movement type resolver can be provided by use of even the linearly movable element.

A third embodiment of the invention will be described with an accompanying drawing.

Third Embodiment

The third embodiment is substantially the same as the second embodiment excepting a slightly difference in the detection coil 60.

Figure 11:
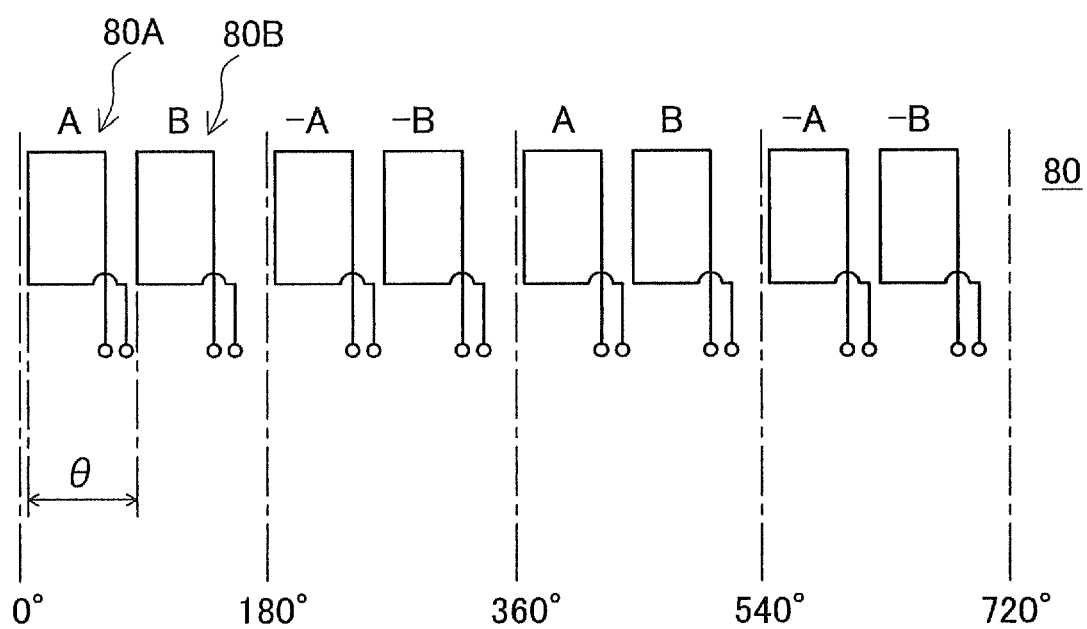
FIG. 11 is a coil pattern diagram of a detection coil in a third embodiment.

FIG. 11 is a coil pattern diagram in the third embodiment. The coil pattern is illustrated in a simplified form but has actually plural winding turns.

A detection coil 80 is configured such that linear-movement detection coils 80A and 80B are alternately placed on a single base plate as shown in FIG. 11. The linear-movement detection coils 80A and 80B are formed in the same printed pattern. Specifically, these coils 80A and 80B, each of which is formed with a width corresponding to one half of the error cycle in electrical angle, i.e., a width corresponding to the shift angle θ, are alternately arranged.

The linear-movement type resolver in the third embodiment having the above configuration can provide the following operations and the advantages.

In the linear-movement type resolver in the third embodiment, the linear-movement detection coils 80A and 80B are formed on the same base plate. In this regard, this resolver can be produced at lower cost than the linear-movement type resolver in the second embodiment and also can provide the same accuracy.

A fourth embodiment of the invention will be described below with reference to accompanying drawings.

Fourth Embodiment

The fourth embodiment is similar to the first embodiment in that the movable element 15 is a rotatable element but different from the first embodiment in a detection coil mounted on the movable element 15. Thus, the following explanation is focused on the differences from the first embodiment.

Figure 12:
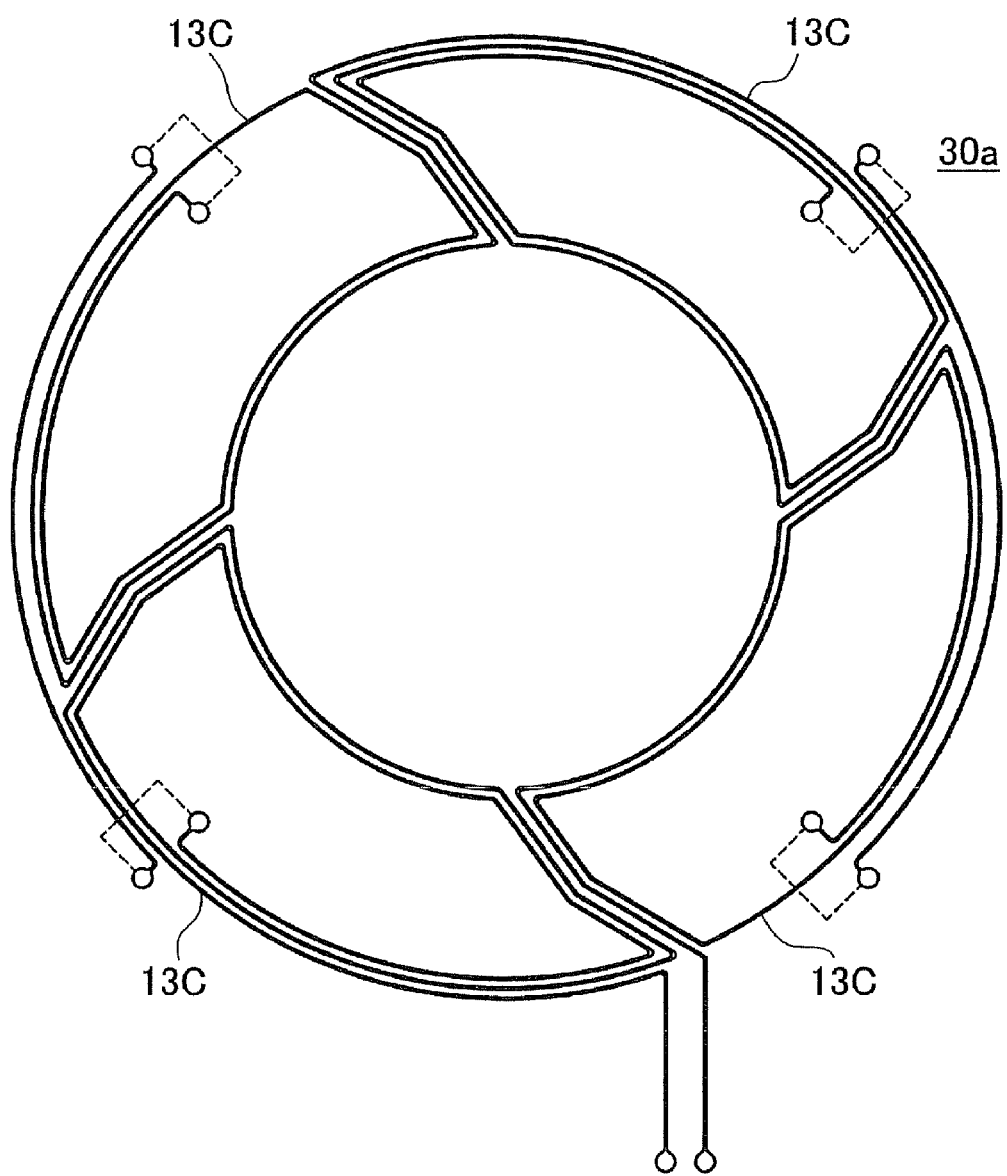
FIG. 12 is a coil pattern diagram of a detection coil in a fourth embodiment.
Figure 13:
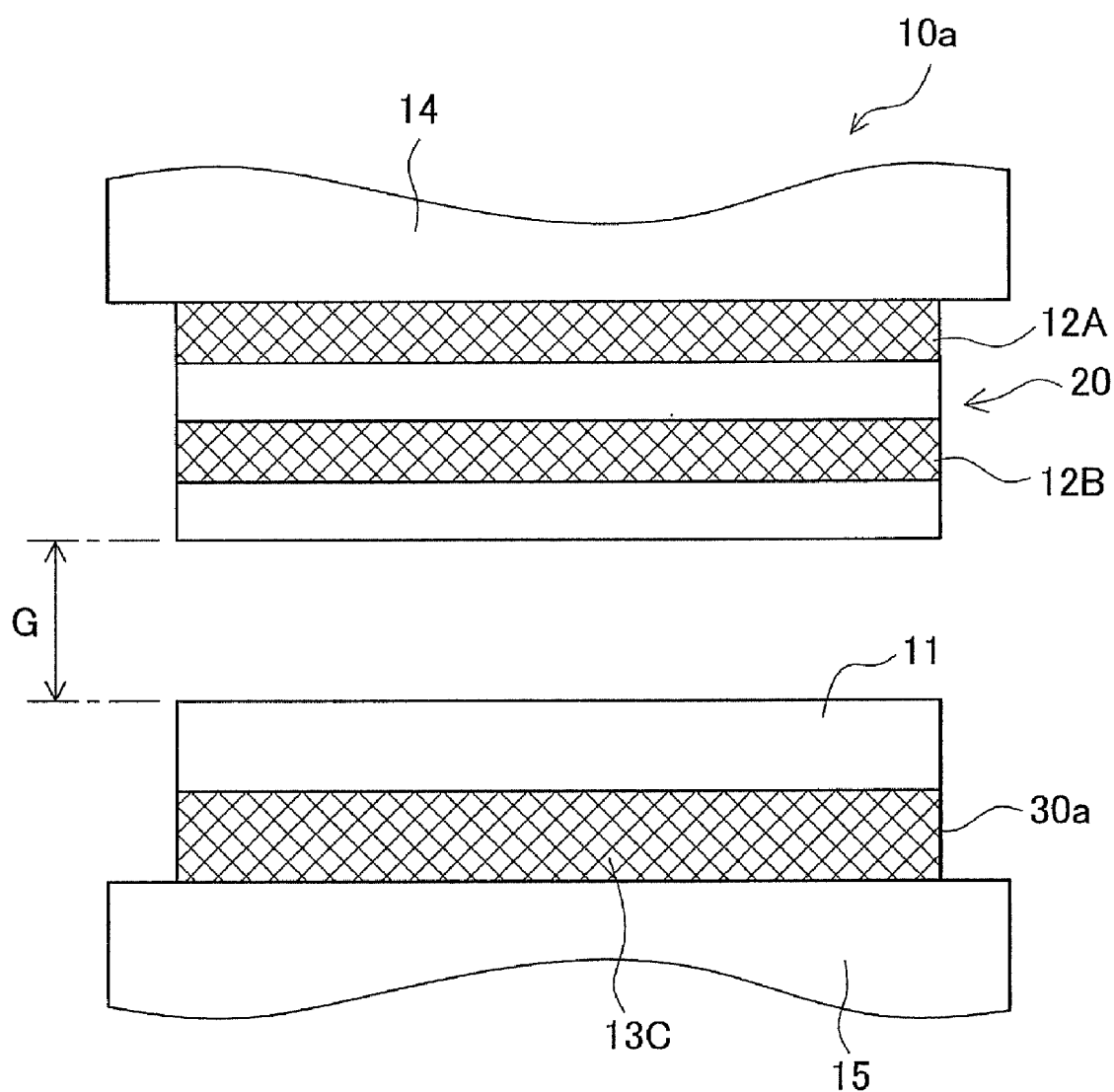
FIG. 13 is a schematic cross sectional view of a resolver in the fourth embodiment.

FIG. 12 is a coil pattern diagram of a detection coil. FIG. 13 is a schematic cross sectional view of a resolver.

A resolver 10a includes an excitation coil 20 and a detection coil 30a. As shown in FIG. 13, the excitation coil 20 and the detection coil 30a are spaced with a gap G. The excitation coil 20 and the detection coil 30a are each formed in a printed pattern on base plates 11 respectively. On the excitation coil 20 side, a first excitation coil pattern 12A and a second excitation coil pattern 12B are provided. On the detection coil 30a side, a detection coil pattern 13C is provided. The excitation coil 20 is mounted on the fixed element 14. The detection coil 30a is mounted on the movable element 15.

The first excitation coil pattern 12A, the second excitation coil pattern 12B, and the detection coil pattern 13C, each being formed on the corresponding base plates 11, have such shapes as shown in FIGS. 1A, 1B, and 12.

Herein, four detection coil patterns 13C of four poles are formed in correspondence to the excitation coil pattern 12. FIG. 12 shows a schematic form but the number of winding turns is actually somewhat larger.

Figure 14:
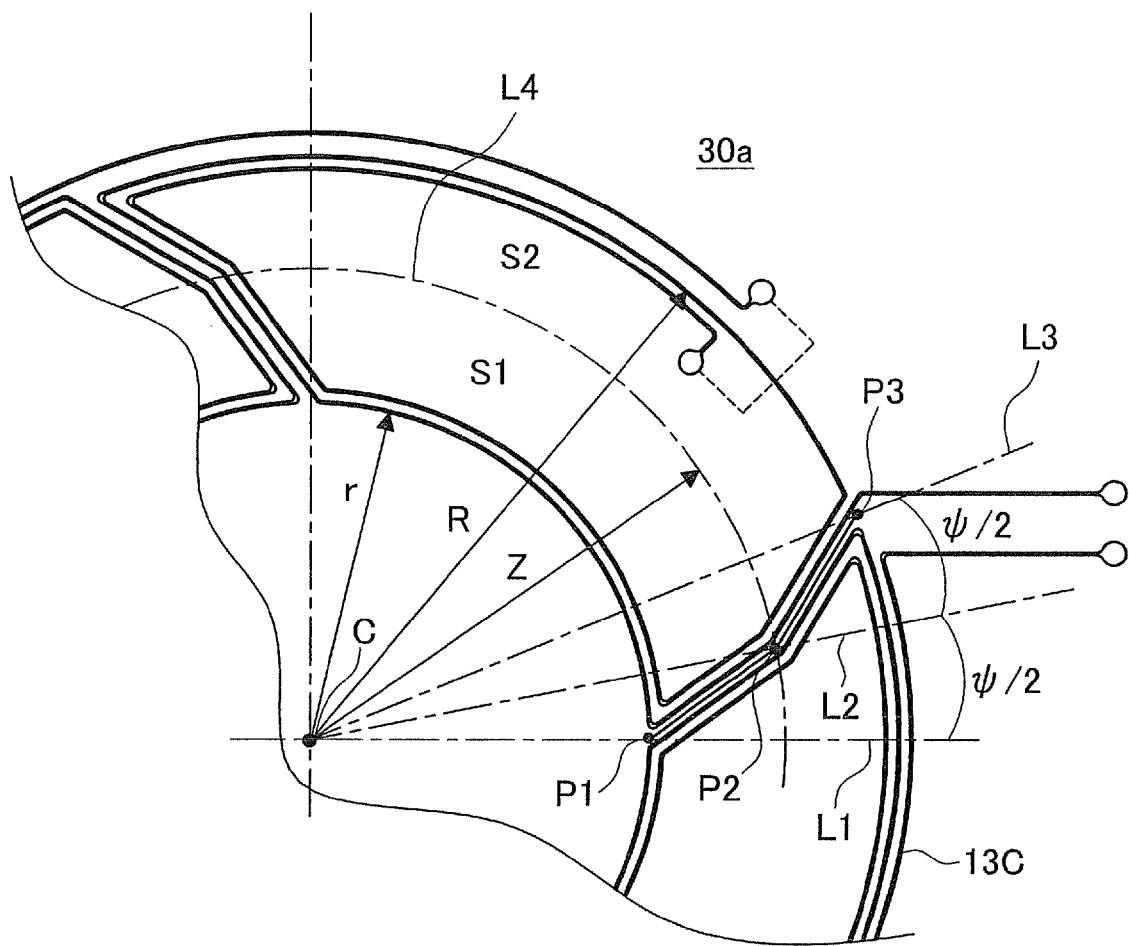
FIG. 14 is an enlarged view of the coil pattern of FIG. 2, in the fourth embodiment.

FIG. 14 is an enlarged view of the detection coil pattern shown in FIG. 12. The shape of the detection coil pattern 13C is designed so that a pattern line passes a start point P1, a relay point P2, and an end point P3, respectively, at a skew angle $\phi$ as shown in FIG. 14. Specifically, the start point P1 and the relay point P2 are connected by a straight line and the relay point P2 and the end point P3 are also connected by a straight line.

Assume that a line connecting the center point C and the start point P1 is a reference line L1; a line connecting the center point C and the relay point P2 is a first phase line L2; and a line connecting the center point C and the end point P3 is a second phase line L3. In this case, the first phase line L2 is angled at a half cycle $\phi/2$ with respect to the reference line L1 and the second phase line L3 is angled at a half cycle $\phi/2$ with respect to the first phase line L2, respectively. A relay line L4 is a curved line taking a relay radius Z.

Herein, the skew angle $\phi$ is represented by the expression:

$$\phi=360/N$$

where N represents the order of error. It is to be noted that the relay radius Z passing the relay point P2 is determined based on a coil inner circumference r and a coil outer circumference R shown in FIG. 14.

The relay radius Z is represented by the expression:

$$Z^2=(R^2+r^2)/2.$$

Each of the detection coil patterns 13C is assumed to be divided by the relay line L4 into an inside coil part S1 corresponding to the first coil and an outside coil part S2 corresponding to the second coil for convenience.

The basic configuration of the resolver 10a is the same as in the first embodiment (see FIG. 5). Accordingly, the magnetomotive force waveform generated in the excitation coil is also similar to that shown in FIG. 6 as in the first embodiment. However, the magnetomotive force waveform W1 is a stepped sine wave as shown in FIG. 5 and therefore will be presented as shown in FIG. 16 when the signal is detected by a conventional detection coil.

Figure 15:
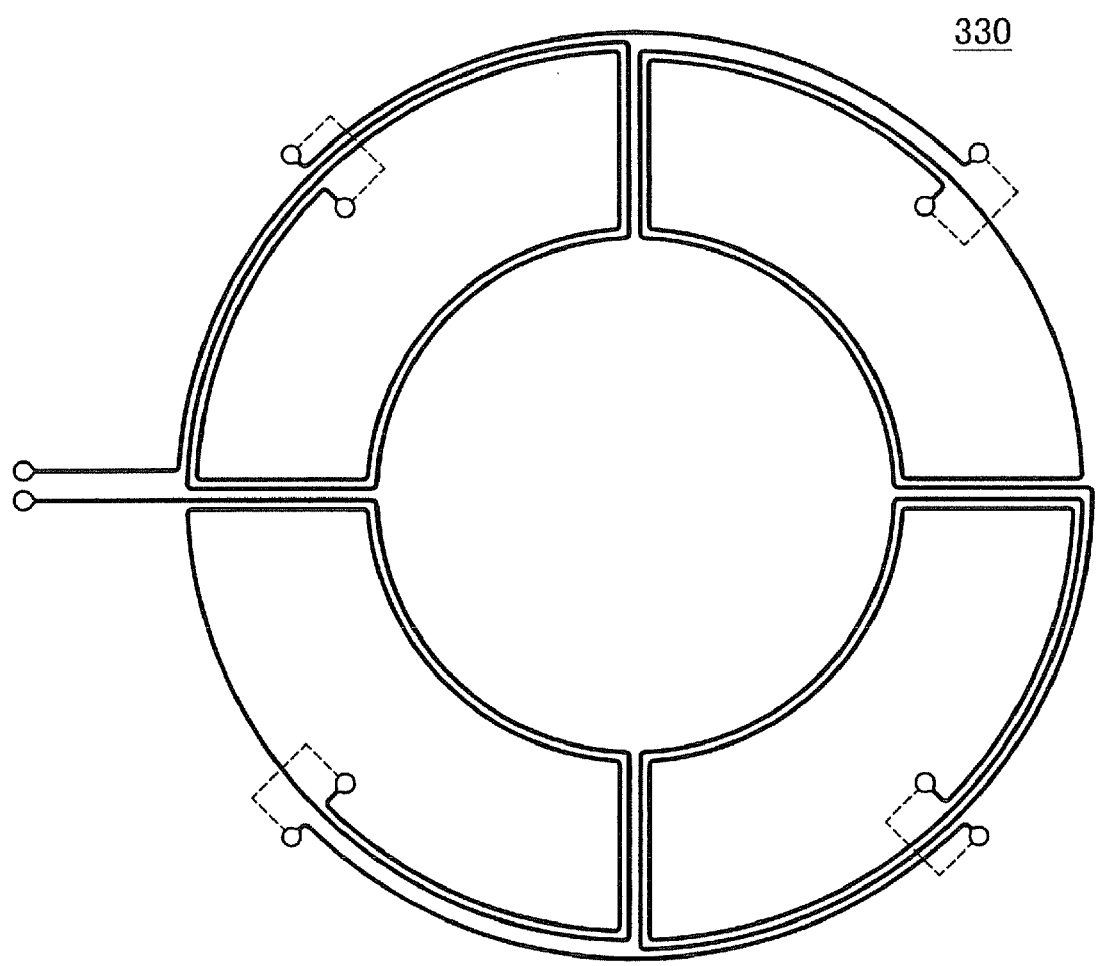
FIG. 15 is a detection coil pattern adopting no skew.

FIG. 15 shows a detection coil pattern adopting no skew. FIG. 16 is a graph showing a waveform detected by a detection coil adopting no skew.

A detection coil 330 adopting no skew, i.e., having no phase shift between the inside coil part S1 and the outside coil part S2 is a 2× resolver as with the detection coil 30a. This coil 330 includes four detection coil patterns arranged in series as shown in FIG. 15.

Figure 16:
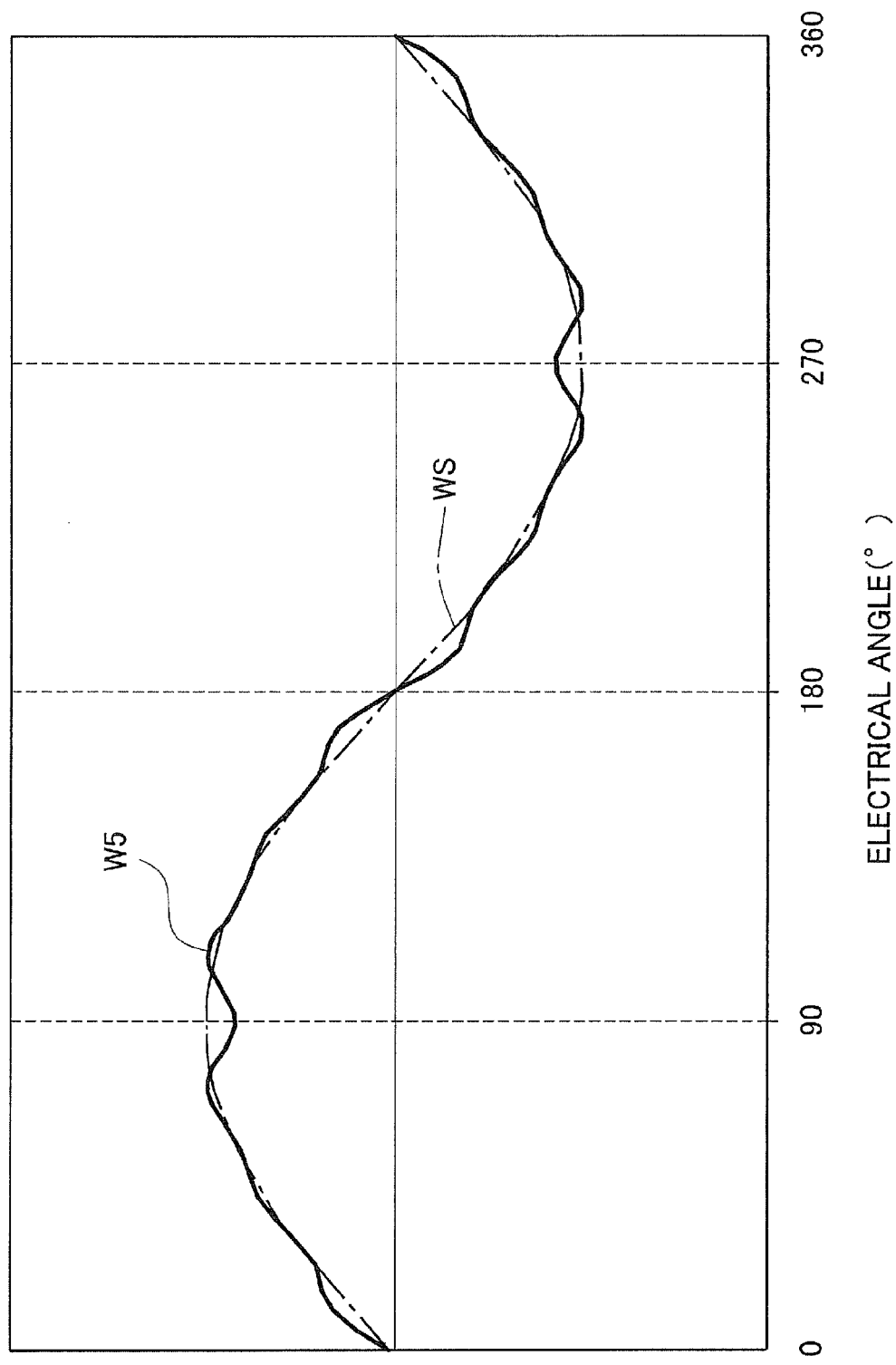
FIG. 16 is a graph representing waveforms detected by the detection coil adopting no skew.

When the detection coil 330 is used in the resolver 10a, the waveform detected by the detection coil 330 is as shown in FIG. 16. In this graph, a vertical axis indicates magnetic force and a lateral axis indicates electrical angle. A detection waveform W5 detected by the detection coil 330 is also plotted to overlap with the ideal waveform WS.

Figure 17:
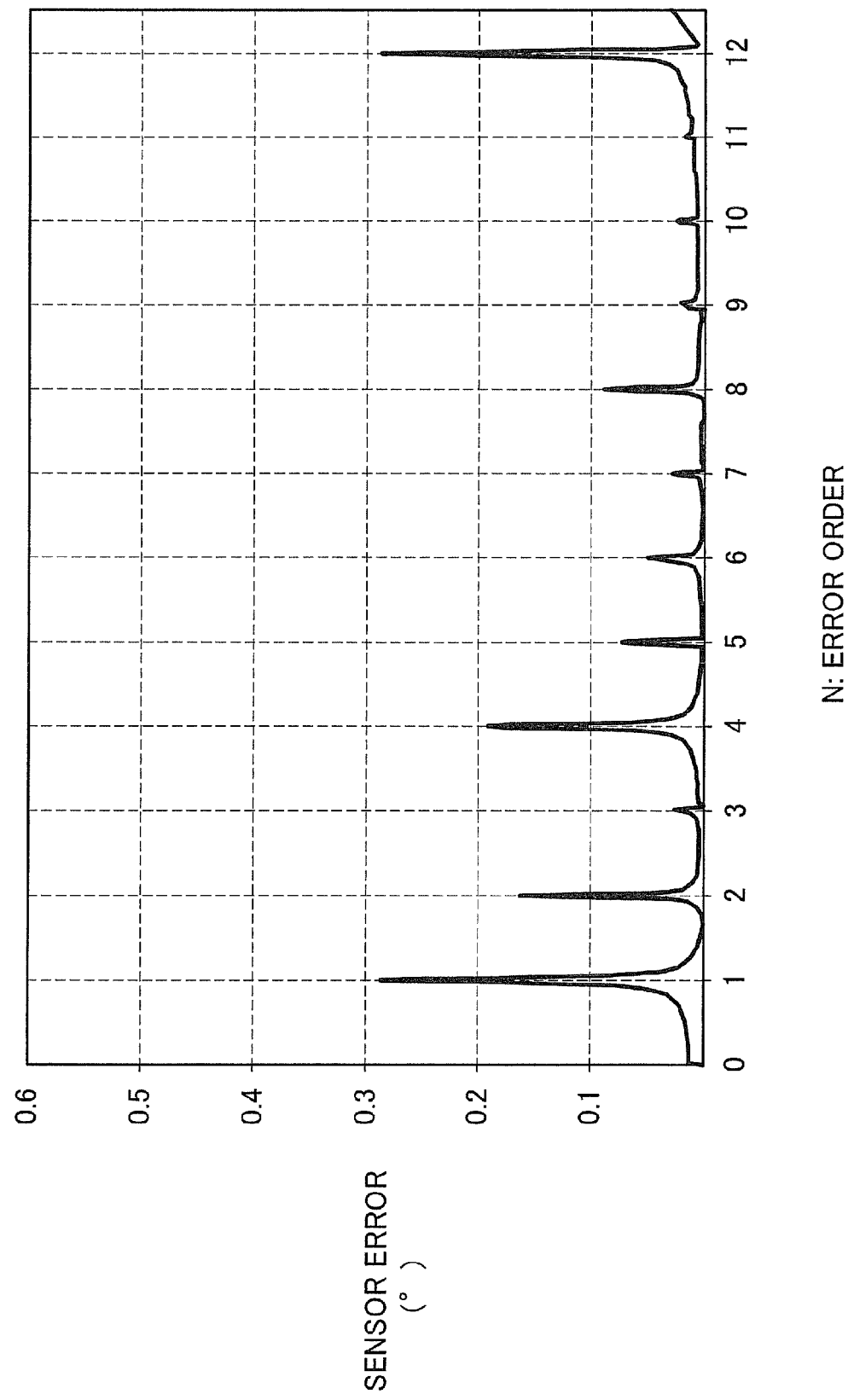
FIG. 17 is a graph showing relation between sensor error and error order in the fourth embodiment.

FIG. 17 is a graph showing relation between sensor error and error order N. In the graph, a vertical axis indicates sensor error and a lateral axis indicates order of error cycle.

When detects the magnetomotive force waveform W1 output from the excitation coil 20, the detection coil 330 detects a waveform like the detection waveform W5. The detection waveform W5 follows the ideal waveform WS but may cause sensor errors as shown in FIG. 17. In the graph, each protruding portion represents noise which is a detection error in the detection coil 330.

In the case of using the excitation coil pattern 12 shown in FIGS. 1A and 1B, such error is unavoidable when the electromotive force waveform W1 shown in FIG. 5 is generated. However, the errors can be corrected in the detection coil 30a side.

This error correction method is achieved by using the detection coil 30a including the detection coil patterns 13C formed on the base plate 11 as shown in FIGS. 12 and 14.

Figure 18:
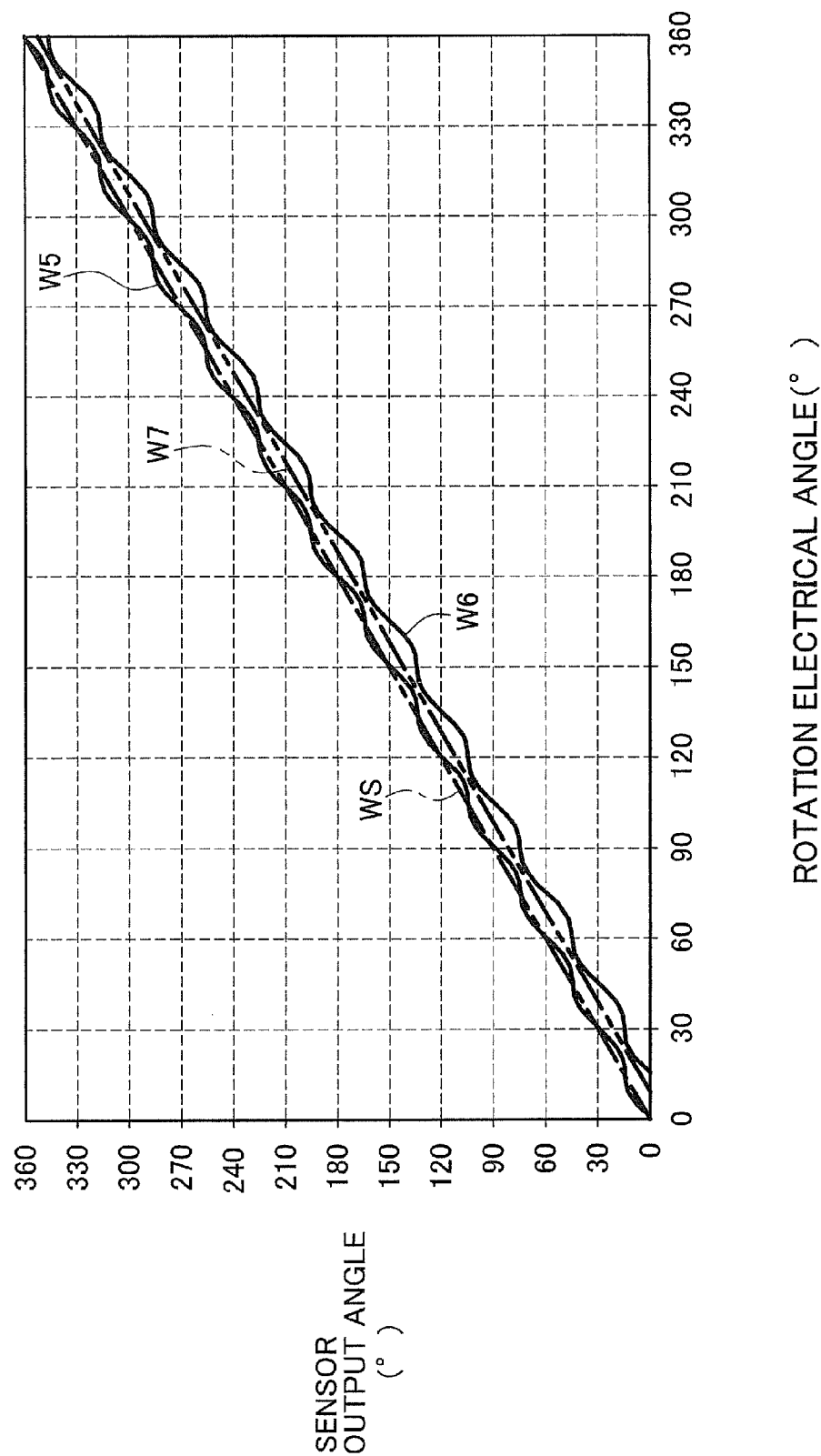
FIG. 18 is a graph showing composite coil output waveforms in the fourth embodiment.

The magnetomotive force waveform W1 generated from the excitation coil 20 is detected by the detection coil 30a. Each detection pattern 13C has such a shape that two coil parts, i.e., the inside coil part S1 and the outside coil part S2 are synthesized as shown in FIG. 18. Accordingly, the errors are canceled out.

The inside coil part S1 and the outside coil part S2 are designed to have almost the same area. It is to be noted that the inside coil part S1 and the outside coil part S2 may be formed two separate coil parts to form the detection coil pattern 13C. In such a case, the same advantages can also be obtained. However, in adjacent sides or edges of the inside coil part S1 and the outside coil part S2, a current flows in opposite directions. The inside coil part S1 and the outside coil part S2 are equal in area and therefore the same amount of current flows in each coil. As a result, the effect is canceled out, that is, the magnetic fields in the adjacent portions are canceled out. Thus, even if the inside coil part S1 and the outside coil part S2 are formed as a single coil, the resolver can provide the same detection accuracy. In light of the production efficiency of coils, accordingly, each coil is designed to be continuous as shown in FIG. 12. This makes it possible to achieve reduction in materials to be used for producing coils, leading to cost reduction.

FIG. 18 is a graph showing a synthetic waveform output from a coil. A signal waveform generated in the inside coil part S1 is the detection waveform W5. A signal waveform generated in the outside coil part S2 is a skew detection waveform W6. The detection waveform W5 and the skew detection waveform W6 are configured to produce a synthetic waveform W7.

The skew detection waveform W6 starts at a point delayed by a half cycle of a skew angle $\phi$ as compared with the detection waveform W5. The synthetic waveform W7 obtained therefrom starts at a point delayed by $\phi/4$ as compared with the detection waveform W5.

Herein, the skew angle $\phi$ is represented by the expression:

$$\phi=360/N$$

where N is a chosen order needing to be canceled. For instance, a twelfth peak of the peaks shown in FIG. 17 protrudes. This error component is canceled. In this case, N=12 and $\phi$ is 30°.

To be specific, the inside coil part S1 and the outside coil part S2 are shifted by φ/2 corresponding to a half cycle of the skew angle φ. The detection coil 30a is thus designed by placing the inside coil part S1 and the outside coil part S2 at positions shifted by 15° in electrical angle. Accordingly, the relay point P2 is shifted by 15° in electrical angle from the start point P1 and the end point P3 is shifted by 15° in electrical angle from the relay point P2. The detection coil 30a is formed by connecting those points by straight lines, resulting in a shape as shown in FIG. 14.

With the above design of the detection coil 30a, the coil 30a can output the synthetic waveform W7.

It is to be noted that the detection waveform W5 and the skew detection waveform W6 shown in FIG. 18 are virtually obtained waveforms in the resolver 10a in the fourth embodiment.

The resolver 10a in the fourth embodiment having the above configuration and operations can provide the following advantages.

A first advantage is to provide a highly accurate resolver. In the resolver 10a in the fourth embodiment includes the excitation coil 20 for receiving the excitation signal and the detection coil 30a for outputting the detection signal. The detection signal changes according to a displacement amount of the movable element 15 provided with the excitation coil 20 or the detection coil 30a. The resolver 10a detects the displacement amount of the movable element 15 based on the excitation signal and the detection signal. In the excitation coil 20 or the detection coil 30a, the inside coil part S1 formed on the radially inner side and the outside coil part S2 formed on the radially outer side have the same area and the outside coil part S2 is shifted in phase by a half cycle from the inside coil part S1.

Since the outside coil part S2 is shifted by half of the skew angle φ from the inside coil part S1, the skew effect can be yielded. Accordingly, the synthetic waveform W7 which is a synthetic wave of the detection waveform W5 detected by the inside coil part S1 and the skew detection waveform W6 detected by the outside coil part S2 can be obtained as a signal. Such synthesizing the detection waveform W5 and the skew detection waveform W6 enables production of the synthetic waveform W7 from which the cyclic error caused by the magnetomotive force waveform W1 has been canceled out.

This cancels one of the peaks of the waveform shown in FIG. 17. To be concrete, N=12 and thus the peak of the twelfth order can be canceled out. In other words, the voltage waveform generated from the magnetic flux detected by the detection coil 30a is the synthetic waveform W7 produced by canceling N-order harmonic component occurring as noise. The resolver 10a can have the improved angle detection accuracy.

Furthermore, another advantage is to achieve both thickness reduction and accuracy improvement of the resolver 10a. The resolver 10a in the fourth embodiment includes the detection coil 30a and the excitation coil 20, at least one of which is formed of a sheet coil.

By using a method of forming the excitation coil pattern 12 and the detection coil pattern 13C on the base plates 11, the resolver 10a can have a thin thickness. This may be achieved by making either the excitation coil 20 or the detection coil 30a in the form of a sheet coil or both of them as a sheet coil in the form of in the fourth embodiment. However, if such a sheet coil form is adopted, however, the excitation coil 20 may cause a problem shown in FIG. 5 that when the magnetomotive force waveform W1 is detected by the detection coil 330, a waveform like the detection waveform W5 is obtained.

Therefore, the inside coil part S1 and the outside coil part S2 are provided to obtain the skew effect, thereby achieving both the thickness reduction and the accuracy improvement of the resolver 10.

A fifth embodiment of the invention will be described below with an accompanying drawing.

Fifth Embodiment

The fifth embodiment is substantially identical to the resolver 10a in the fourth embodiment excepting a detection coil pattern of a detection coil. The following explanation is given to the differences from the fourth embodiment.

Figure 19:
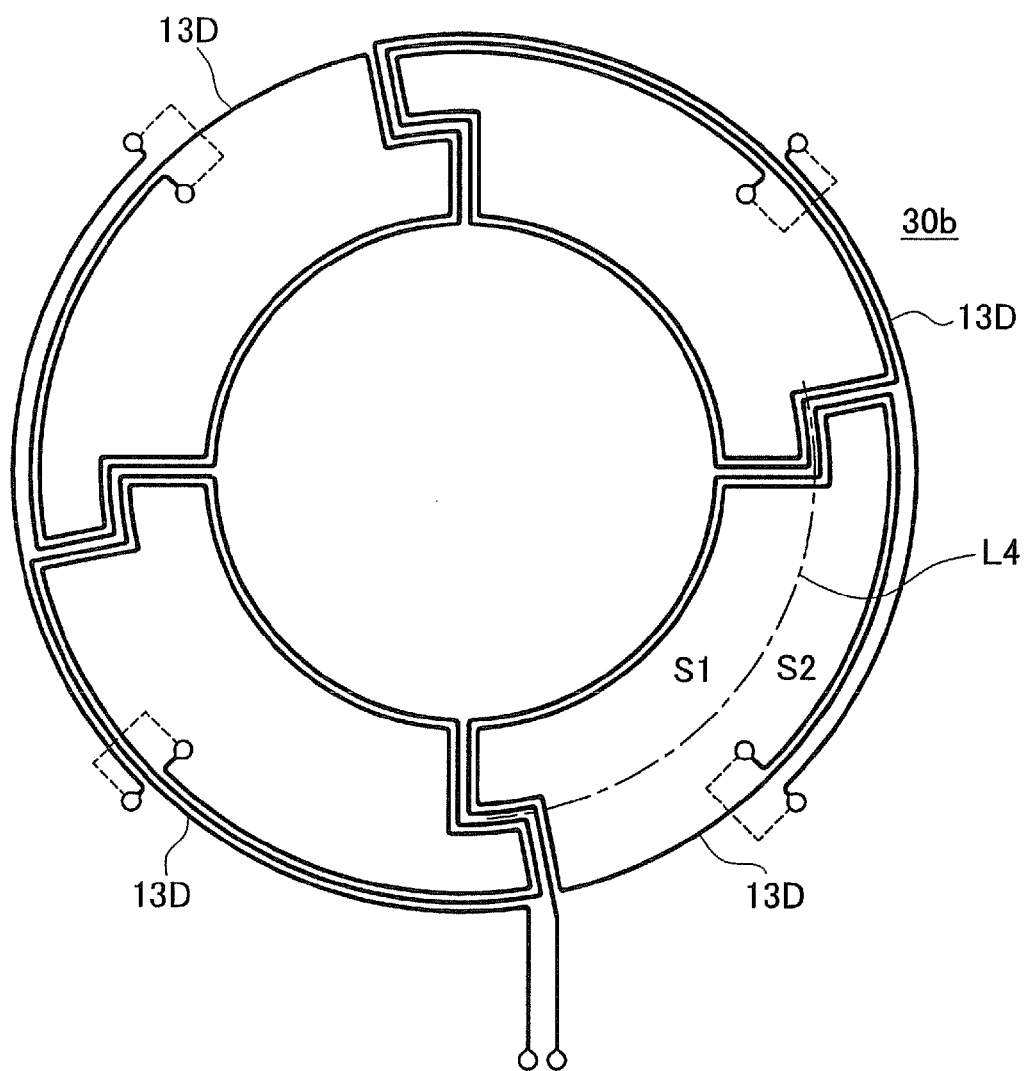
FIG. 19 is a coil pattern of a detection coil of a resolver in a fifth embodiment.

FIG. 19 is a coil pattern diagram of a detection coil 30b of the resolver in the fifth embodiment.

A detection coil pattern 13D of the detection coil 30b in the fifth embodiment is different from the detection coil pattern 13C in the fourth embodiment in a manner of connecting the start point P1, the relay point P2, and the end point P3.

The detection coil pattern 13D in the fifth embodiment is designed so that a pattern line passes the start point P1, extends along the reference line L1, turns at an intersection point of the reference line L1 and the relay line L4 to extend along the relay line L4, and passes the relay point P2, and then extends along the first phase line L2 from the relay point P2, and reach the coil outer circumference R.

Four detection coil patterns 13D having the outer shape formed as above are placed to form the detection coil 30b for detecting the magnetomotive force waveform W1 from the excitation coil 20.

The fifth embodiment having the above configuration can provide the same operations and advantage as those in the fourth embodiment. To be specific, the detection coil pattern 13D in the fifth embodiment can provide almost the same advantage as the detection coil pattern 13C in the fourth embodiment.

However, the areas of the inside coil part S1 and the outside coil part S2 can be made equal more easily in the detection coil pattern 13D in the fifth embodiment than and therefore the increase in detection accuracy of the resolver can be expected.

A sixth embodiment of the invention will be described below with accompanying drawings.

Sixth Embodiment

The sixth embodiment is different in a resolver constituted of a linearly movable element from the fourth embodiment in which the resolver 10a is constituted of the rotatable element. However, they have the same principle.

Figure 20:
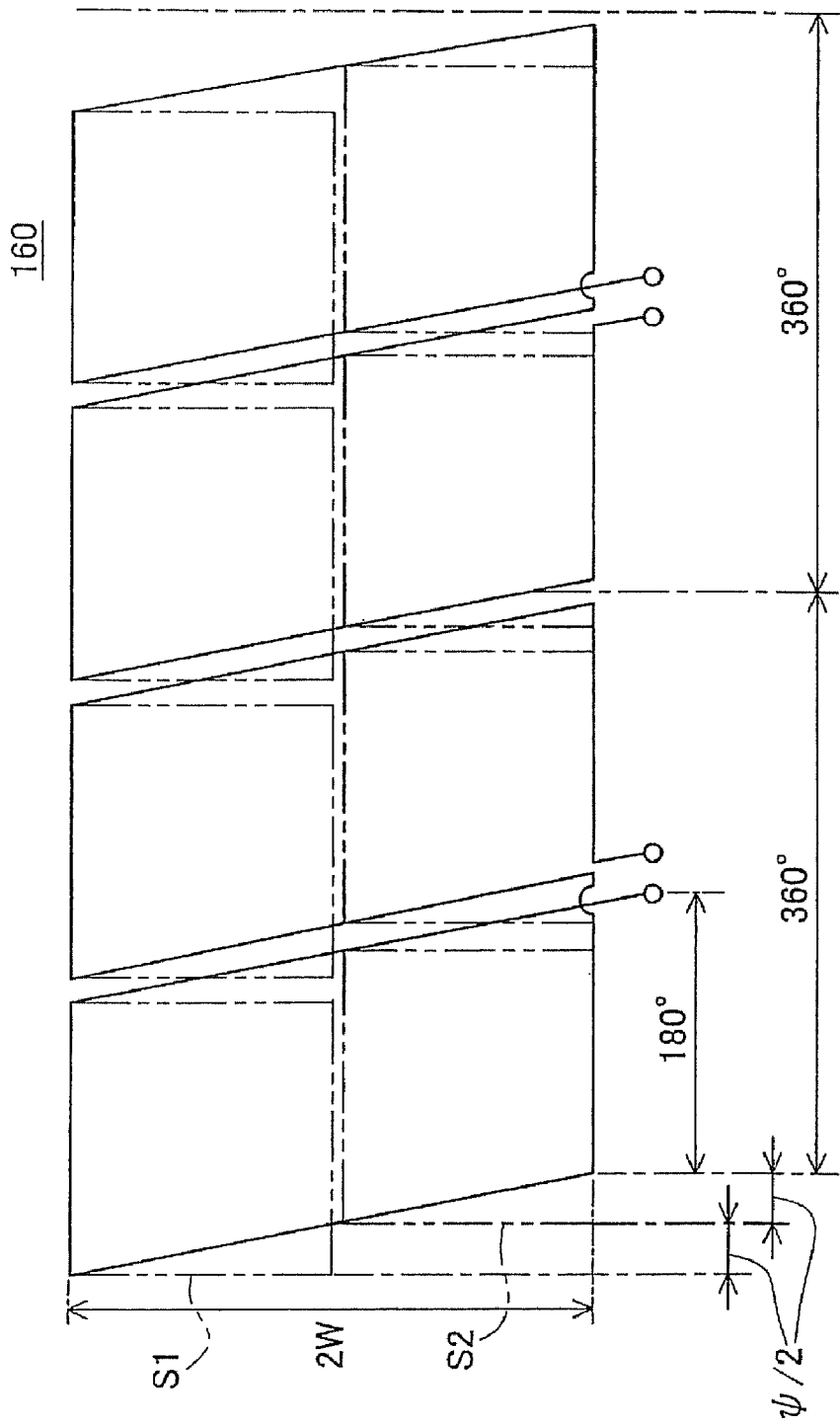
FIG. 20 is a coil pattern diagram of a detection coil of a resolver in a six embodiment.
Figure 21:
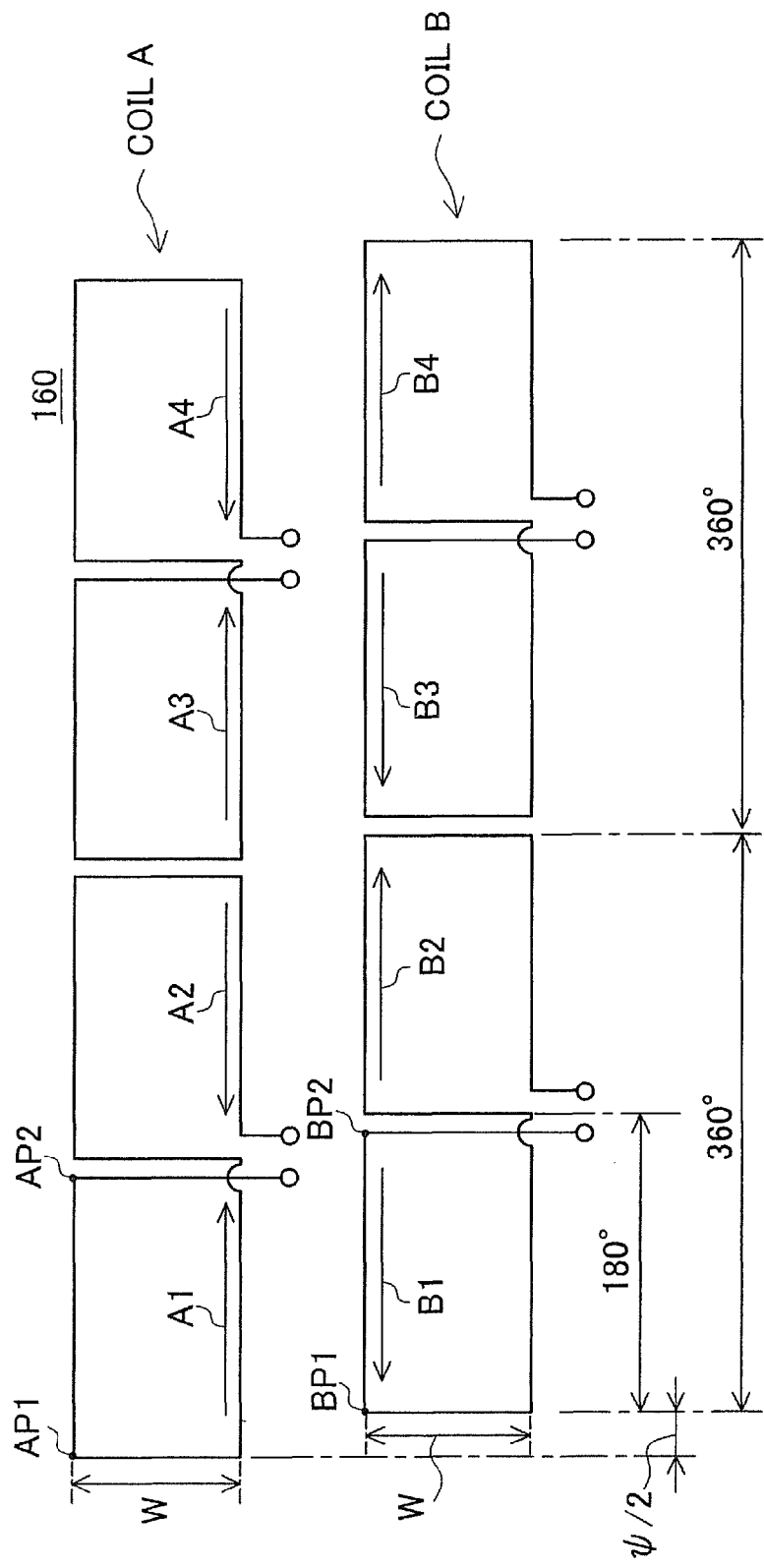
FIG. 21 is a conceptual view of a coil pattern of a detection coil.

FIG. 20 is a coil pattern diagram of a detection coil 160 of the resolver in the sixth embodiment. FIG. 21 is a conceptual diagram of a coil pattern of the detection coil 160 shown in FIG. 21.

The detection coil 160 is formed of coils A and B shown in FIG. 21 connected into one coil. The coils A and B have the same shapes each having the width W and the length corresponding to 180° in electrical angle. The coil B is placed in a position shifted by a half cycle (φ/2) of an order cycle of a detection error desired to be canceled out from the coil A. In FIG. 20, a first coil part S1 and a second coil part S2 indicated by imaginary lines correspond to the coil A and the coil B shown in FIG. 21 respectively.

In the detection coil 160 in which the coils A and B are arranged as a pattern shown in FIG. 21, current flows in opposite directions between a portion indicated by an arrow A1 of the coil A and a portion indicated by an arrow B1 of the coil B. Accordingly, the resultant magnetic fields are canceled out. Even when the coils A and B are coupled, therefore, the same synthetic waveform W7 can be obtained. The same applies to arrows A2 and B2, arrows A3 and B3, and arrows A4 and B4. Consequently, the coil pattern in FIG. 21 and the coil pattern in FIG. 20 will provide almost the same results.

Thus, a vertex AP1 of the coil A and a vertex BP1 of the coil B are connected by a straight line and a vertex AP2 of the coil A and a vertex BP2 of the coil B are connected by a straight line to form a coil having a width of 2W.

In the above way, the coil pattern shown in FIG. 20 can provide the same effect as in detection of magnetic flux from an excitation side by the coil pattern shown in FIG. 21. It is to be noted that an actual coil has a plurality of winding turns.

The excitation coil is similarly configured of linearly arranged coils but not illustrated. The coil pattern is formed to have a width of 2W. The number of magnetic poles is 4 and the axial double angle is 2 as in the fourth embodiment. By use of such excitation coil and detection coil 160, a 2× linear-movement resolver can be produced.

The linear-movement type resolver in the sixth embodiment having the above configuration can provide the following operations and advantages.

This embodiment, basically similar to the fourth and fifth embodiments relating to the rotatable element, can achieve a thin-shaped resolver with increased accuracy.

The detection coil 160 is designed such that the coils A and B shown in FIG. 21 are connected to each other so that they are shifted by a half cycle ($\phi/2$) of an order cycle of a detection error desired to be canceled out. Accordingly, the magnetic flux to be detected by the detection coil 160 is detected as a signal whose n-order harmonic component has been canceled out. This results in improved accuracy of position detection by the linear-movement type resolver.

The present invention is explained in the above embodiments but is not limited thereto. The present invention may be embodied in other specific forms without departing from the essential characteristics thereof.

For instance, although the first and fourth embodiments use the excitation coil 20 and the detection coil 30 or 30a each formed of a sheet coil as mentioned above. Either or both of them may be formed in other shapes different from the sheet form. Basically, the excitation coil 20 is preferably formed of a sheet coil in view of thickness reduction, thereby providing the cancel effect or the skew effect by the opposite phase signal to prevent the noise caused by the stepped electromotive force waveform W1. However, the cancel effect or the skew effect can be obtained from any other shape than a flat shape. Any shape can contribute to an increase in accuracy of the resolver 10 and 10a.

In the first and third embodiments, the detection coil 30 is formed of the first detection coil pattern 13A corresponding to the first coil and the second detection coil pattern 13B corresponding to the second coil, the coil patterns 13A and 13B being placed at positions shifted by the shift angle θ. Not only the detection coil but also the excitation coil may be configured of the first and second coils. In the case of adopting a one-excitation and two-detection type instead of a two-excitation and one-detection type, specifically, the excitation coil may be configured of the first and second coils placed in positions shifted with the shift angle θ. In this case, the accuracy increasing effect can similarly be obtained.

In the fourth and sixth embodiments, similarly, the excitation coil is formed of a combination of two coils, i.e., the first excitation coil and the second excitation coil, and the detection coil is formed of a single coil. That is, the embodiments describe the resolver of a two-excitation and one-output type but the invention may be applied to a resolver of a one-excitation and two-output type.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A resolver for detecting an amount of displacement of a movable element, the resolver comprising:
   an excitation coil for receiving an excitation signal; and
   a detection coil for outputting a detection signal,
   wherein one of the detection coil and the excitation coil includes a first coil and a second coil that are placed to overlap with each other and connected in series or in parallel so that the second coil is shifted in phase from the first coil,
   wherein one of the detection coil and the excitation coil is provided in the movable element and the other of the detection coil and the excitation coil is provided in a fixed element, and the detection coil and the excitation coil are placed in positions that face each other.

2. The resolver according to claim 1, wherein
   an amount of phase shift between the first and second coils is a half of an order cycle of a detection error desired to be canceled out from among detection errors occurring when the first and second coils are placed with no phase shift therebetween.

3. The resolver according to claim 1, wherein
   an amount of phase shift between the first and second coils is represented by the expression of 360/(N×2), where N is an integer greater than 1.

4. The resolver according to claim 1, wherein
   the first and second detection coils are placed to have a total coil width of larger than 180° in electrical angle.

5. The resolver according to claim 1, wherein
   at least one of the detection coil and the excitation coil is formed of a flat-shaped coil.

6. The resolver according to claim 1, wherein the movable element.

7. The resolver according to claim 1, wherein
   the movable element is a linearly movable element.

8. A resolver for detecting an amount of displacement of a movable element, the resolver comprising:
   an excitation coil for receiving an excitation signal; and
   a detection coil for outputting a detection signal,
   wherein one of the excitation coil and the detection coil includes a first coil part and a second coil part, the second coil part is placed adjacent to the first coil part, the first and second coil parts constitute at least a part of a spiral coil, and the first and second coil parts occupy a same area and the second coil part is shifted in phase from the first coil part,
   wherein one of the detection coil and the excitation coil is provided in the movable element and the other is provided in a fixed element, and the detection coil and the excitation coil are placed in positions that face each other.

9. The resolver according to claim 8, wherein
   an amount of phase shift between the first and second coil parts is a half of an order cycle of a detection error desired to be canceled out from among detection errors occurring when the first and second coil parts are placed with no phase shift therebetween.

10. The resolver according to claim 8, wherein an amount of phase shift between the first and second coil parts is represented by the expression of 360/(N×2), where N is an integer greater than 1.

11. The resolver according to claim 8, wherein at least one of the detection coil and the excitation coil is formed of a sheet coil.

12. The resolver according to claim 8, wherein
the movable element is a rotatable element,
the first coil part is formed on a radially inner side of the second coil part, and
the detection coil is configured to detect an amount of rotation of the rotatable element.

13. The resolver according to claim 8, wherein the movable element is a linearly movable element.

\* \* \* \* \*

UNITED STATES PATENT AND TRADEMARK OFFICE
CERTIFICATE OF CORRECTION

| | | |
|---|---|---|
| PATENT NO. | : 8,269,487 B2 | Page 1 of 1 |
| APPLICATION NO. | : 12/591047 | |
| DATED | : September 18, 2012 | |
| INVENTOR(S) | : Tomoaki Inoue et al. | |

It is certified that error appears in the above-identified patent and that said Letters Patent is hereby corrected as shown below:

Column 14, Line 44, Claim 6 should read

6. The resolver according to claim 1, wherein the movable element <u>is a rotatable element</u>.

Signed and Sealed this
Eighteenth Day of December, 2012

David J. Kappos
*Director of the United States Patent and Trademark Office*